(12) United States Patent
Hamedi et al.

(10) Patent No.: US 11,947,616 B2
(45) Date of Patent: Apr. 2, 2024

(54) SYSTEMS AND METHODS FOR IMPLEMENTING SESSION COOKIES FOR CONTENT SELECTION

(71) Applicant: VIZIT LABS, INC., Boston, MA (US)

(72) Inventors: Jehan Hamedi, South Boston, MA (US); Elham Saraee, Jamaica Plain, MA (US); Zachary Halloran, Braintree, MA (US)

(73) Assignee: Vizit Labs, Inc., Boston, MA (US)

( * ) Notice: Subject to any disclaimer, the term of this patent is extended or adjusted under 35 U.S.C. 154(b) by 0 days.

(21) Appl. No.: 17/673,635

(22) Filed: Feb. 16, 2022

(65) Prior Publication Data
US 2023/0259575 A1      Aug. 17, 2023

(51) Int. Cl.
| | |
|---|---|
| G06F 16/957 | (2019.01) |
| G06F 16/9535 | (2019.01) |
| G06F 16/954 | (2019.01) |
| G06F 16/955 | (2019.01) |
| G06F 16/958 | (2019.01) |

(52) U.S. Cl.
CPC ...... *G06F 16/9577* (2019.01); *G06F 16/9535* (2019.01); *G06F 16/954* (2019.01); *G06F 16/955* (2019.01); *G06F 16/958* (2019.01)

(58) Field of Classification Search
None
See application file for complete search history.

(56) References Cited

U.S. PATENT DOCUMENTS

| | | | |
|---|---|---|---|
| 2014/0244387 A1* | 8/2014 | Patton | G06Q 30/0269 705/14.53 |
| 2015/0026308 A1* | 1/2015 | MacTiernan | H04L 67/535 709/219 |
| 2017/0206549 A1* | 7/2017 | Chaudhuri | G06N 20/00 |
| 2017/0228762 A1* | 8/2017 | Riviello | G06Q 30/0273 |
| 2020/0027004 A1* | 1/2020 | Qian | G06F 16/2365 |
| 2020/0151387 A1* | 5/2020 | Choi | H04L 67/02 |

* cited by examiner

*Primary Examiner* — Kevin S Mai
(74) *Attorney, Agent, or Firm* — Foley & Lardner LLP

(57) ABSTRACT

A method is disclosed. The method may include establishing a connection with a client device via an application executing on the client device; detecting one or more web pages that the application of the client device has visited during the established connection; determining a target audience for the connection based on the detected one or more web pages; responsive to determining the target audience, identifying a set of content items from memory based on each content item of the set having a stored association with an identifier of the target audience in the memory; selecting a first content item from the set of content items; and transmitting the first content item to the client device over the connection for display on a web page.

19 Claims, 15 Drawing Sheets

| Content Item | Target Audience | Performance Score | Ranking |
|---|---|---|---|
| Basketball01.jpeg | Sports | 98 | 1 |
| Colorblue.jpeg | Male | 67 | 8 |
| Colorpink.jpeg | Female | 63 | 6 |
| Fryingpan212.jpeg | Cooking | 78 | 5 |
| Longshorts17.jpeg | Clothing | 45 | 12 |
| Gardenhose38.jpeg | Gardening | 23 | 17 |

FIG. 8

SYSTEMS AND METHODS FOR IMPLEMENTING SESSION COOKIES FOR CONTENT SELECTION

BACKGROUND

Many people use the Internet every day. Some use it to discover information such as news, recipes, phone numbers, etc. Some use the Internet to communicate with others through mediums such as chat rooms, message boards, and e-mail. Traffic on the Internet is large, and many people use the Internet for extended amounts of time.

Users of the Internet may use the Internet to such a degree that content providers can effectively market goods and services to customers or potential customers using the Internet. Often, such advertisers seek to provide relevant content to the users that the users can appreciate. To do so, content providers generally place third-party tracking cookies on browsers that the users use to browse different web pages on the Internet. The cookies may enable content providers to collect data and better determine which content most applies to individual users. However, various privacy concerns have caused companies that support browsers to disable third-party cookies and restrict content providers from storing such cookies on the companies' browsers. Accordingly, content providers are left "in the dark" and may not have any method of providing relevant content to users of the Internet.

SUMMARY

To overcome the aforementioned technical deficiencies, a server implementing the systems and methods described herein may use first-party cookie data of a computer accessing the server's website to provide relevant content. For example, instead of providing content to computing devices based on websites the computer visited across the Internet, the server may instead maintain a temporary record of the web pages the computer has visited that were provided by the server itself. The server may do so using data the server collected to improve the user's experience with the website such as data to maintain a shopping cart on the website or data that indicates which web pages the user visited during the connection for quick retrieval if the user wishes to revisit the pages. The server may detect which web pages the server had transmitted to the computing devices over its connections with the computing devices. The server may estimate the target audiences with which the connection is associated based on data about the detected web pages. The server may then transmit content items that are associated with the target audience to the computer as the computer communicates with the server over the connection, thus providing the computer with relevant content without relying on third-party tracking techniques.

In accordance with some aspects of the disclosure, a method is disclosed. The method may include establishing, by a computing device, a connection with a client device via an application executing on the client device; detecting, by the computing device, one or more web pages that the application of the client device has visited during the established connection; determining, by the computing device, a target audience for the connection based on the detected one or more web pages; responsive to determining the target audience, identifying, by the computing device, a set of content items from memory of the computing device based on each content item of the set having a stored association with an identifier of the target audience in the memory; selecting, by the computing device, a first content item from the set of content items responsive to the first content item having a first stored ranking value higher than a second stored ranking value of a second content item of the set of content items; and transmitting, by the computing device, the first content item to the client device over the connection for display on a web page.

In accordance with some aspects of the disclosure, a system is disclosed. The system may include one or more hardware processors configured by machine-readable instructions to: establish a connection with a client device via an application executing on the client device; detect one or more web pages that the application of the client device has visited during the established connection; determine a target audience for the connection based on the detected web pages; responsive to determining the target audience, identify a set of content items from memory of the computing device based on each content item of the set having a stored association with an identifier of the target audience in the memory; select a first content item from the set of content items responsive to the first content item having a first stored ranking value higher than a second stored ranking value of a second content item of the set of content items; and transmit the first content item to the client device over the connection for display on a web page.

In accordance with some aspects of the disclosure another method is disclosed. The method may include storing, by a computing device, a plurality of content items and a ranking value for each of the plurality of content items in a memory of the computing device; establishing, by the computing device, a connection with a client device via an application executing on the client device; rendering, by the computing device, a first web page and a first content item of the plurality of content items on the client device via the connection, the first content item selected from the plurality of content items based on the first content item having a highest ranking value of the plurality of content items; receiving, by the computing device, a request for a second web page from the application via the connection; and rendering, by the computing device, the second web page and a second content item of the plurality of content items on the client device via the connection, the second content item selected from the plurality of content items responsive to determining the first content item has already been rendered during the connection and the second content has a second highest ranking value of the plurality of content items after the first content item.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 8 illustrates a content item database, in accordance with one or more implementations.

Figure 1:
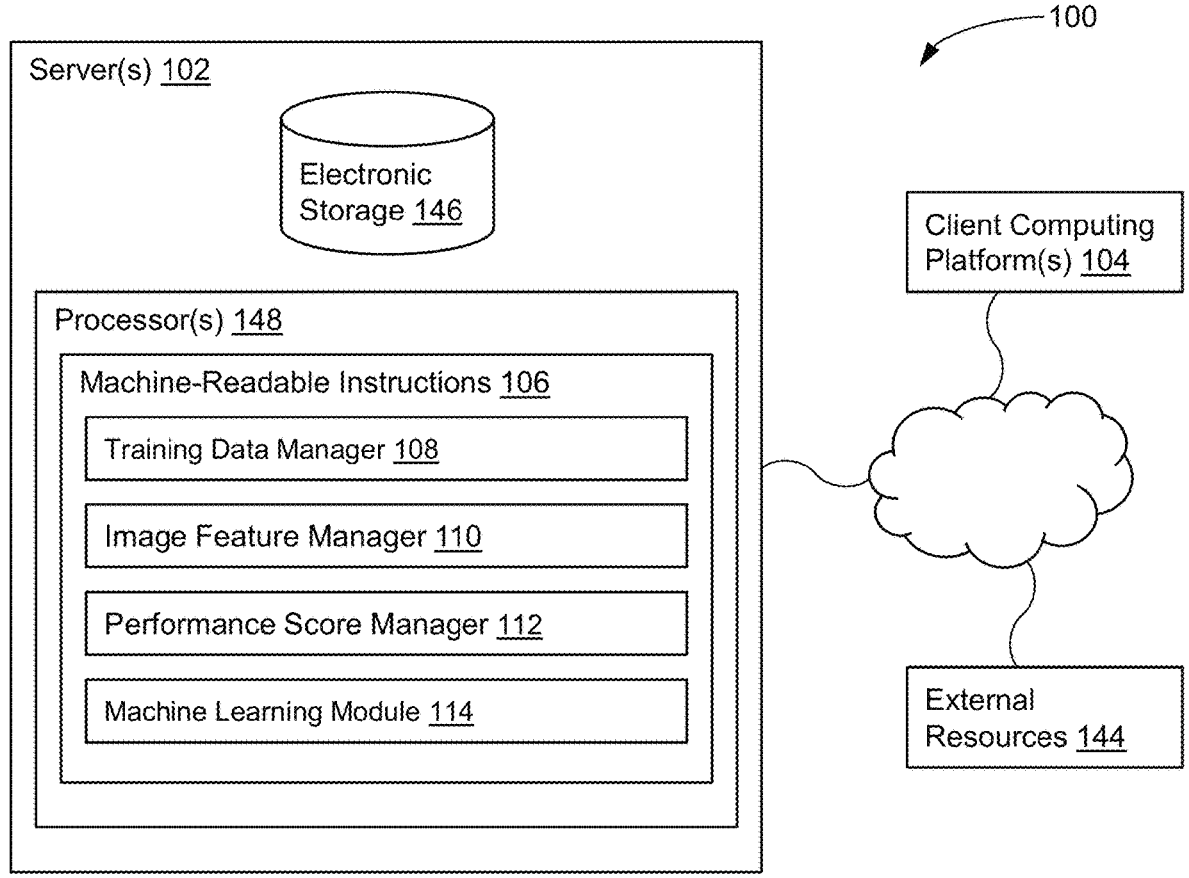
FIG. 1 illustrates a system configured for training a machine learning model, in accordance with one or more implementations.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Image-based content can be among the most important content posted by users to web-based or online platforms, such as social media websites and other websites. Such content can also be referred to as "creative," and can be included as part of an advertising campaign of a business, a post from an individual that contributes to the individual's online image, a graphic design composition using a software application like PhotoShop, or a photograph captured via a user's camera on a mobile device. Often, users (e.g., businesses or individuals) post content items such as images that are intended to appeal to a group of viewers who share a particular set of demographic characteristics. Such a group can be referred to as a target audience or intended audience.

Selecting the best content (e.g., images), and the right attributes of content, can improve the performance of the content among the target audience. For example, performance of content can be or can relate to audience awareness, customer engagement, memorability, preference, conversions, and sales resulting from or related to the content. However, it can be difficult for a user to know in advance how a particular content item is likely to perform among a target audience. Inefficient and inaccurate "guess and check" techniques can be common practice. As a result, a large amount of capital can be wasted on "A/B testing" of content items, because it is difficult to determine in advance which content items will perform best. Thus, advertising and other forms of content generation and/or content publishing today often begin with a content item (e.g., an image or a video) that is published, and then subsequently finds an audience after it has been published, rather than first selecting a target audience and designing content specifically to appeal to the selected target audience. This process can be expensive and error prone.

The systems and methods described in this disclosure can implement a scoring mechanism which can predict how a content item is likely to perform among a predetermined target audience. For example, various computer-implemented techniques, including artificial intelligence and machine learning algorithms, can be used to train a model (e.g., a neural network or other machine learning model) to generate a performance score for an image. The performance score can correspond to a prediction of how the image is likely to perform among a predetermined target audience. In addition, this disclosure provides techniques for gathering existing content items that have been viewed or engaged with by the target audience and using actual performance metrics related to the existing content items to train the model that generates the performance score for a given image. Thus, the model can be trained using real-world information about the types of content that the audience prefers and is not limited to any one platform (i.e. the technology is platform-agnostic).

The model can also be applied to a limitless number of target audiences. Furthermore, the subject matter described in this disclosure can be used to overcome challenges in fields including consumer research, consumer testing, and market testing. For example, a consumer panel or focus group often takes a period of days or weeks, and a significant investment of capital, to evaluate candidate content items. Due to this time and expense, these techniques are often limited to very small samples of people and few examples of candidate content items. The performance scoring model describe in this disclosure can perform these types of analyses in real-time without soliciting feedback from any human users. In that way, the system can be used to effectively simulate the results of a focus group having a specified set of demographic or psychographic characteristics evaluating candidate content items. As a result, a user such as a designer or creative professional who is actively developing a new creative work can quickly and iteratively evaluate new concepts, or concept variations, using the techniques described in this disclosure to get fast results and insights to streamline their work.

The model described in this disclosure can also be applied to multiple audiences, thereby enabling a user to quantitatively determine which image of multiple candidate images is likely to be most effective across more than one target audience (e.g., a first target audience of men ages 18-24 and a second target audience of women ages 34-55), which using traditional research techniques may require two distinct sample populations to be surveyed independently.

The model can also be applied to search indexing. For example, the model can be trained using any set of training data, which may include a set of training data based on image subject matter rather than a particular target audience. In some implementations, the model can be trained to evaluate images having common subject matter, such as images that depict an apple. Continuing with this example, using such a model, instead of searching through hundreds of pages of search results related to the search term "apple" and subjectively selecting one resulting images as the "best" picture of an apple, the model may be used to produce performance scores that are indexed with images that result from a search for the term "apple," which can enable a user to quickly find the best images of an apple for a particular target audience. This can improve time efficiency for content discovery and the image searching process, while also eliminating human operator guesswork about which images are likely to perform best among a target audience. Thus, the systems and methods described below represent a significant improvement in the fields of artificial intelligence and machine learning, as well as the fields of content development, electronic searching, business, marketing, design, consumer research, and testing performance optimization.

The subject matter described in this disclosure can be used to overcome challenges relating to the training of machine learning models with only limited data sets. For example, the performance scoring model may be trained in a manner that results in accurate performance scores even with access only to a relatively small set of training data. This can be achieved, for example, by first extracting stylistic features from a set of training images, rather than relying on the raw image data in the training images themselves to train the model. As a result, the model can be trained in a faster and more computationally efficient manner, relative to conventional techniques for training machine learning models. This can enable the model to run on computer hardware that does not require large amounts of memory.

Training a machine learning model based on raw image data of a set of training images can be difficult because there may not be significant meaning in the pixel-by-pixel variation of an image that relates to its perceived quality among an audience. Stated differently, raw image data may have a low signal-to-noise ratio for purposes of training a machine learning model. Because the training process for a machine learning model can cause the model to "learn" patterns in the training data, training data that contains a high level of noise may cause the model to erroneously determine that patterns resulting from the noise are important. To cause the model to recognize the more important patterns can require a very large training data set. As a result, a massive set of training images may be required in order to train such a model to produce good results in this manner. In some implementations, it may be very difficult or impossible to obtain such a large training data set, and it may be computationally intensive to train the model in this manner due to the size of the training data set. This disclosure addresses the technical challenges that arise from attempting to train a machine learning model based on raw image data by first extracting higher-level features from each training image. For example, such a feature can be any feature that may relate to more than one pixel in an image. These features can be referred to as "stylistic features," and may relate to aspects of an image such as a type of object shown in the image, a dominant color scheme in the image, a brightness or contrast of the image, etc. These features can also include features that relate to the overall presentation of material in an image, such as layout or composition features. Such features may matter more to a human viewer's perception of image quality than lower-level features (e.g., individual pixel features), and can therefore be more useful for training the model than the raw image data. The techniques of this disclosure can train a machine learning model based on these extracted features. As a result, the model can be trained more accurately with a much smaller training data set, which also can reduce computational complexity. In addition, training the model using a combination of different types of high-level features can allow the model to evaluate candidate images based on the interplay of these different feature types relative to one another within the same image.

In some implementations, it can be difficult to identify and extract meaningful features from an image in an automated fashion. To address this technical challenge, in some implementations classification or detection networks can be used to extract features from an image. These types of networks can be used to classify an input image into one of a small number of states. For example, a detection network could be used to determine whether an image includes a dog (e.g., the model classifies images into two states, including one state for images that depict dogs and another state for images than do not depict dogs). Such a network may include nodes arranged in layers including an input layer, several hidden layers that form a "black box," and an output layer that provides an answer to the classification question. For many applications, the outputs of hidden layers of a classification network may not be of interest because they do not answer a classification question, and so they are often ignored. However, as described further below, the outputs of these hidden layers in a classification network that is used to process image data (e.g., an object detection network, a scene detection network, etc.) can provide useful information about features of an image that are important to human perception of image quality and subtle aspects of an image that tend to increase viewer engagement. This disclosure describes techniques for using such information to efficiently train a machine learning model. Such a machine learning model may make use of a wide range of such features in a set of training images, to improve the accuracy of the model's performance in evaluating a new candidate image that has not been previously analyzed by the model.

In some implementations, feature sets can be mathematically represented as tensors. Some feature sets can be much larger than others. In some implementations, larger feature sets can overwhelm smaller feature sets during training of a machine learning model. For example, due to differences in the size of certain features sets, the model may not properly account for the importance of a smaller feature set. To address this technical challenge, this disclosure provides techniques for introducing feature tensors at different layers of a machine learning model. For example, larger feature tensors may be introduced at an input layer of the model, and smaller feature tensors may be introduced at a hidden layer downstream from the input layer. This approach can allow smaller feature tensors to be given more significance than their small size would suggest for purposes of training the model, because they are introduced closer to the output.

As described above, unlike an end-to-end convolutional neural network, the machine learning model described in this disclosure can use image features extracted from a source image. For example, image features can be extracted using one or more other machine learning processes. In some implementations, such features may be reused for purposes of training multiple instances of the machine learning model in a manner that improves overall efficiency of the training process. For example, this can enable an "extract once, use many" framework whereby the extraction process is performed only once, but the extracted features can be reused any number of times to train multiple instances of the machine learning model. In some implementations, the extraction process may represent a majority of processor utilization (e.g., CPU and/or GPU utilization). Other computational work, such as training the model using the extracted features, may require substantially less resources. For example, if 97% of the resource utilization occurs in the extraction stage and only 3% occurs in during training of the model, then each additional pass through an instance of the model may only incur around 3% additional resource utilization, dramatically increasing the efficiency of the system.

Furthermore, traditionally, computer users that input images to a machine learning model to obtain performance scores are often left in the dark as to how the machine learning model generated the scores, and relatedly, how a user can use such information to improve his/her score. For instance, a user may apply an image to a convolutional neural network and obtain a performance score of 70% without any indication of the features of the image that were used to generate the performance score or the impact such features had. To determine how the score was calculated, the user would need to manually input a large number of images and identify patterns as to which features of the images caused the images to have higher or lower performance scores. This process may be difficult given the nature of machine learning models as the models may learn hidden patterns that are not easily apparent to the human eye, even when given a large sample of image performance scores and access to the weights and parameters of the models. Therefore, what is needed is a method for manipulating the machine learning model after the model has generated a performance score for an image to interpret where in the image the model was "looking" when generating the performance score and the impact different portions of the image had on the performance score. Such a method would enable a user to identify features of the image or video that are contributing to positive impressions/positive reactions to the image, as well as enable the user to identify "opportunity areas" of the image which may be features which are not performing as strongly as expected or rather are negatively contributing to the score.

By implementing the systems and methods described herein, after executing a machine learning model to obtain a performance score for an image, a processor may manipulate the data generated by the model to automatically generate a performance score heat map for the image with colors overlaying the image to indicate how the specific portions of the image affected the performance score. If the model is a neural network, the processor may extract values from locations within the neural network and use back-propagation techniques to obtain impact scores for different features of the image indicating how the features impacted the performance score. The processor may evaluate the impact scores and determine whether each feature had a positive or negative impact on the performance score and the magnitude of the impact. The processor may identify the locations of the image that correspond to the different features and generate a heat map overlay that has colors at locations within the overlay that correspond to the impact scores of the features of the image. The processor may place the overlay over the image to generate an evaluation image that enables a user to easily see which portions of the image had the largest or smallest impact on the performance score and whether the impact was positive or negative. A processor may also generate a written description of one or more features which are highlighted in the heat map that are driving the positive or negative impact to improve user understandability. Such a written description of the features may also contain numerical values or scores measuring the influence or impact of such features in the evaluation. Written descriptions from more than one image, for example, may be used to generate a description of a "visual trend" that is influencing the audience's behavior with images. Thus, the processor can generate an evaluation image that illustrates data indicating which objects or characteristics to include in an image and which objects or characteristics to exclude in future images to increase an image's performance score.

Further, because the processor may train multiple machine learning models to simulate different target audiences (e.g., audiences of different ages, genders, hobbies, interests, etc.), the processor may create an easy-to-use interface that allows a user to obtain heat maps for the same image for different target audiences. Because each machine learning model may be trained based on data generated based on interaction and viewing data of members of the corresponding target audience, the models may be trained to look at different aspects of an image from each other to determine performance scores for the same image. By way of example, if an image is of a family taking a camping trip, features in the image representing a campfire may correspond to a high positive impact for a machine learning model trained to simulate males aged 18-30 while the same features may have little or even a negative impact for a machine learning model trained to simulate females of the same age. Thus, the processor may assign different colors or stylistic renderings to the campfire features of the image when generating heat maps for each model's performance score for the image. A user may select different target audiences to view such heat maps to easily determine how an image would perform with different target audiences.

The systems and methods described herein are advantageous over systems that use machine learning models to predict whether an object is in a particular image using a classification process. Such models may only look at features that indicate an object is in an image while disregarding any features of the image that are not relevant to the object. Instead, by implementing the systems and methods provided herein, a processor may evaluate whether different features of an image had a positive or negative impact on the performance score for the entire image, enabling users to have a full view of how the performance score was determined for an image using regression-based methods.

System

FIG. 1 illustrates a system 100 configured for training a machine learning model, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

In some implementations, server(s) 102, client computing platform(s) 104, and/or external resources 144 may be operatively linked via one or more electronic communication links. For example, such electronic communication links may be established, at least in part, via a network such as the Internet and/or other networks. Thus, the client computing platform(s) 104 may transmit data (e.g., image data) to the server(s) 102 by way of the Internet or other networks. In some implementations, the client computing platform(s) 104 may execute a web browser application that can interface with the server(s) 102 via one or more websites hosted by the server(s) 102. For example, the server(s) 102 may provide an application programming interface (API) that can be accessed by the client computing platform(s) 104 by way of such a website. In some implementations, the client computing platform(s) 104 may instead access such an API by other means (e.g., via a dedicated application that executes on the client computing platform(s) 104, rather than through a website). In some implementations, functionality described as being performed by the server(s) 102 may instead be performed directly by the client computing platform(s) or by the external resources 144). It will be appreciated that this is not intended to be limiting, and that the scope of this disclosure includes implementations in which server(s) 102, client computing platform(s) 104, and/or external resources 144 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 144, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a server, and/or other computing platforms.

External resources 144 may include sources of information outside of system 100, external entities participating with system 100, and/or other resources. In some implementations, some or all of the functionality attributed herein to external resources 144 may be provided by resources included in system 100.

Server(s) 102 may include electronic storage 146, one or more processors 148, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 146 may comprise non-transitory storage media that electronically stores information. The electronic storage media of electronic storage 146 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 146 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 146 may include one or more virtual storage resources (e.g., cloud storage, a virtual private network, and/or other virtual storage resources). Electronic storage 146 may store software algorithms, information determined by processor(s) 148, information received from server(s) 102, information received from client computing platform(s) 104, and/or other information that enables server(s) 102 to function as described herein.

Processor(s) 148 may be configured to provide information processing capabilities in server(s) 102. As such, processor(s) 148 may include one or more of a digital processor, an analog processor, a digital circuit designed to process information, an analog circuit designed to process information, a state machine, and/or other mechanisms for electronically processing information. Although processor(s) 148 is shown in FIG. 1 as a single entity, this is for illustrative purposes only. In some implementations, processor(s) 148 may include a plurality of processing units. These processing units may be physically located within the same device, or processor(s) 148 may represent processing functionality of a plurality of devices operating in coordination. Processor(s) 148 may be configured to execute modules 108, 110, 112, and/or 114, and/or other modules. Processor(s) 148 may be configured to execute modules 108, 110, 112, and/or 114, and/or other modules by software; hardware; firmware; some combination of software, hardware, and/or firmware; and/or other mechanisms for configuring processing capabilities on processor(s) 148. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, and/or 114 are illustrated in FIG. 1 as being implemented within a single processing unit, in implementations in which processor(s) 148 includes multiple processing units, one or more of modules 108, 110, 112, and/or 114 may be implemented remotely from the other modules. The description of the functionality provided by the different modules 108, 110, 112, and/or 114 described below is for illustrative purposes, and is not intended to be limiting, as any of modules 108, 110, 112, and/or 114 may provide more or less functionality than is described. For example, one or more of modules 108, 110, 112, and/or 114 may be eliminated, and some or all of its functionality may be provided by other ones of modules 108, 110, 112, and/or 114. As another example, processor(s) 148 may be configured to execute one or more additional modules that may perform some or all of the functionality attributed below to one of modules 108, 110, 112, and/or 114.

The server(s) 102 may be configured by machine-readable instructions 106. Machine-readable instructions 106 may include one or more instruction modules. The instruction modules may include computer program modules. The instruction modules may include one or more of a training data manager 108, an image feature manager 110, a performance score manager 112, a machine learning module 114, and/or other instruction modules.

Together, the training data manager 108, the image feature manager 110, the performance score manager 112, the machine learning module 114, and the other components of the system 100 can be configured to train a machine learning model for assigning a performance score to a candidate image. The performance score can represent a prediction of how well the candidate image will resonate with a predetermined target audience (e.g., a number of interactions (e.g., likes or ratings) the image is likely to receive, a value for a product shown in the image, a length of time a person may look at the image, a predicted number of sales, etc.). Thus, to train the model to provide accurate performance scores, the system 100 may first gather, collect, receive, or otherwise access a set of training data to train the machine learning model. In some implementations, the training data can be based on characteristics of the target audience.

In some implementations, the target audience can be defined by one or more traits or characteristics shared by members of the target audience. For example, the target audience can be defined in terms of any combination of demographics, behavioral tendencies, lifestyle indicators, or other specific market segmentation criteria. In some implementations, the traits of the target audience can be received directly from a user of one or more of the client computing platforms 104. In some implementations, the user can transmit information corresponding to one or more traits of a desired target audience to the server 102. For example, the user can be a business interested in marketing a product to a particular target audience (e.g., sports fans between the ages of 18 and 34).

After the audience is defined, the training data manager 108 can be configured to identify the training data including a set of images that are viewed and/or interacted with members of the target audience. In some implementations, the training data can include images published to websites, such as social media accounts or business websites, that are typically viewed by members of the target audience. For example, such a website can be hosted by one or more of the client computing platforms 104. Such a website can be referred to as a web-based property, and may include any number of web pages, image files, and other electronic content that can be accessed by the server 102. In some examples, the target audience itself can be defined in terms of one or more web-based properties. For example, the target audience can include users who view, or follow, a particular web-based property, or otherwise engage with its published contents.

In order to learn the visual preferences for the target audience, the training data manager 108 can identify or determine the types of images, and attributes of those images, that the audience is visually engaged by. In some implementations, the training data manager 108 can derive this information algorithmically by looking at the target audience's Internet and social media activities and behaviors (e.g., the web-based properties they visit, the retailers they shop at, the influencers they follow on social media, the news and magazines they read, the social media contents they interact with, etc.). In some examples, web-based properties may be commercial in nature, but they do not need to be.

In some implementations, the training data manager 108 can identify at least one input property, which can also be referred to as a seed property, that is preferred by the target audience. For example, the seed property can be or can include a URL of a social media account, a website domain, or URLs of individual media content. The training data manager 108 can be configured to determine a set of other web-based properties that are visited by the same or similar group of users (e.g., the target audience) as the seed web-based property. In some implementations, the training data manager can determine the set of other web-based properties by applying a network analysis algorithm based on the visitors or published contents of the seed web-based property. In an illustrative example, the seed web-based property may include at least one consumer brand's page or content on a social media platform. Two metrics of such an account may be a number of followers of the account and a number of 'engagers' of the account. For example, an "engager" may be a user who has commented on or "liked" the contents published by that account. Thus, if a post from the web-based seed property was "liked" 25 times, the training data manager 108 can infer that there were 25 engagers of that content. In some implementations, the training data manager 108 can extract a sample list of followers or engagers of such an account, for example based on the followers' or engagers' usernames. The training data manager 108 may also identify accounts that are commonly followed by followers of the seed web-based property. In some implementations, this can be achieved using simple attribute matching-based approaches. In some implementations, this can be achieved using a webgraph, or a collection of websites, and the training manager 108 can identify websites that are commonly visited by a similar demographic, psychographic, or other behavior-based cohort of users. In some implementations, this can be achieved by identifying web-based properties that publish visually similar contents on a visual graph. It should be understood that these techniques are exemplary only and should be not interpreted as limiting the scope of this disclosure.

In some implementations, the training data manager can rank determined set of web-based properties based on a proportion (e.g., a "density") of the composition of the visitors of those web-based properties who are also members of the target audience and who interact with those properties. Visitors may include users who view the web-based properties, "followers" of the web-based properties, "content engagers" of the web-based properties, or any other users who interact with images published by the web-based properties, for example.

From this information, the training data manager 108 can identify a subset of the web-based properties that are most uniquely visited by the target audience. For example, based on a determination that the visitors who interact with a seed web-based property tend to share a set of characteristics (e.g., an audience that includes female yoga enthusiasts under 35 years old), the training data manager 108 can identify other properties that are also frequently visited by a high proportion of that same audience or a similar audience having overlapping characteristics. This process can allow the training data manager 108 to identify the subset of web-based properties preferred by the target audience.

In some implementations, the training data manager 108 can use this subset of web-based properties as the basis for harvesting one or more sets of images. These harvested images can be referred to as training images. For example, the training data manager 108 can examine social media accounts, business websites, and other online resources associated with the identified subset of web-based properties to locate the training images for the target audience.

In some implementations, the training data manager 108 can apply analytical techniques to determine which of the identified subset of web-based properties have posted images on social media, or on another medium, and that have some type of interaction data associated with them. For example, the training data manager 108 may examine the volume and frequency of postings and the proportion of engagement earned on postings relative to total viewership of those postings made by the web-based property. The training data manager can then, based on a series of internal rules & algorithms, evaluate the usability of the information that can be derived from the web-based property, its suitability for different purposes within the system, and the importance of any data related to the property to the training process. The training data manager 108 may also examine the relevance of the image contents from a particular web-based property to a target audience relative to other images harvested on the audience outside of one individual web-based property. For example, the interaction data can include a number of "likes," a number of comments, etc. Such interaction data for a given image can also be referred to as an "engagement metric" for the image. In some implementations, the training data manager 108 can generate or determine an engagement metric for an image based on the interaction data for the image. An engagement metric for an image can be useful, because it can indicate whether the target audience prefers the image relative to other images they have viewed or interacted with. Thus, if an image doesn't have any associated interaction data, then the training data manager 108 can remove that image from the set of training images.

In some implementations, the training data manager 108 can be configured to determine which of the identified subset of web-based properties are "visually influential" among the target audience. For example, the training data module can be configured to establish minimum thresholds for characteristics of a web-based property such as its size and popularity, quality of images posted to the web-based property, relevance of image content to the target audience, number of images posted to the web-based property, engagement thresholds with posted images (e.g., thresholds for any type or form of interaction data), user sentiment in the comments or other reactions to the images posted to the web-based property, etc.

In some examples, the training data manager 108 can determine visually influential properties based on one or more property categories that tend to be visually rich. For example, web-based properties that are categorized as apparel or lifestyle can be identified as more visually influential, relative to other categories of web-based properties. In some implementations, the training data manager 108 can filter out or otherwise exclude images from web-based properties that are categorized as less visually influential. In some examples, less visually influential categories may include government and banking.

In some implementations, the training data manager 108 can normalize the engagement metrics for images based on a variety of factors. For example, the training data manager can apply a weight to the engagement metrics of images in the dataset based on engagement rates of each of the images. In one example, the training data manager 108 can divide an engagement metric for an image by a number of followers of its respective web-based property to determine a normalized engagement metric for the image. In another example, the training data manager 108 can normalize the engagement metric based on a number of views or impressions for each image. For example, if 100 users viewed images A and B, 50 users clicked on image A, and 75 users clicked on image B, then the training data manager 108 can normalize the engagement metrics to indicate that image B is more visually engaging that image A.

In some implementations, the training data manager 108 may be configured to normalize the engagement metric for a training image based on a size of its audience (e.g., a number of visitors to the web-based property on which the training image was published). For example, this can help to avoid ranking an image as high performing or low performing based primarily on the overall popularity of a web-based property on which the image is posted, rather than on the quality of the image itself. Thus, a lower quality image posted on a very popular website may not have a higher normalized engagement metric than a high-quality image posted on a less popular website. Stated differently, the training data manager 108 can determine normalized engagement metrics for training images in a manner that prevents the size of an audience for the image (or for the web-based property that published the image) from overwhelming other information about the image. Audience size can be a factor of in determining a normalized engagement metric for an image, however normalized engagement metrics may not scale linearly with audience size. For example, a first training image and a second training image may each have a similar engagement metric. If the first image has an audience that is ten times as large as the audience for the second image, the training data manager 108 can determine that the normalized engagement metric for the first image should be larger than the normalized engagement metric for the second training image. However, in some implementations the training data manager 108 may determine a normalized engagement metric for the first training image that is less than ten times as large as the normalized engagement metric for the second training image. In some implementations, the training data manager 108 may be configured to normalize the engagement metric for each training image based on engagement of the audience with the plurality of images included in the respective web-based properties over time. For example, this can help to account for variations over time in audience size of a web-based property from which training images are gathered.

In some implementations, if a web-based property has too few followers, too few images, poor images, highly variable contents and themes, or poor engagement signals, the training data manager 108 can remove images from that web-based property from the training data. For example, even if the web-based property is popular among the target audience, the images published to that web-based property may not be visually engaging to the target audience and therefore may not provide value for the training data.

In some implementations, the training data manager 108 can use one or more sample images, rather than an entire web-based property, as the seed for the process of selecting training data. In this approach, the training data manager 108 can identify or receive an image of a subject matter that is relevant and preferred by a target audience and is therefore likely to be visually descriptive of the audience. Then, the training data manager 108 can identify a set of web-based properties based on the seed image and can use these web-based properties as the basis for dataset generation as described above. In some implementations, the training data manager 108 can match an input image to a set of saved images (e.g., stored in the electronic storage 146. The training data manager 108 can then determine one or more best-fit web-based properties related to the saved images and can use those web-based properties as the basis for gathering the training dataset.

In some implementations, the training data manager 108 can use a seed web-based property to find similar web-based properties based on visual material published from each web-based property. For example, if a target audience includes a men's fashion audience, the training data manager 108 can identify one example of a men's fashion web-based property to use as the seed, and can also identify similar web-based properties that also post images of men's fashion-related visual material to gather the training dataset. In some implementations, the training data manager 108 can receive a set of web-based properties representing the target audience directly from a user of one of the client-computing platforms 104. For example, the user may be a business who has performed their own market research to identify relevant web-based properties.

Conventional techniques for defining an audience and or selecting training data can include convening a focus group or survey of a number of members of a desired audience, showing them a large number of images, and asking them to rank those images by preference. This technique can similarly produce a labeled dataset of visual material preferred by the audience. However, using the techniques described above, the training data manager 108 can determine the target audience and gather training images in a manner that does not require this very time consuming, expensive, error-prone, and potentially biased manual process. As a result, training data gathered using the techniques disclosed herein can be more accurate and less biased, and the approaches can more easily be scaled to a large number of audiences. In some implementations, the images from all of the web-based properties identified by the training data manager 108 can become the training dataset.

In some implementations, the training data manager 108 may instead select a set of training images without a defined target audience. For example, the set of training images can be chosen based on the subject matter of the images themselves, rather than based on characteristics of users who visit the web-based properties from which the training images are harvested. Thus, the training data manager 108 can be configured to identify training images that relate to certain subject matter (e.g., based on metadata that may be associated with each training image, such as a text-based caption or description for each image). It should be understood that the techniques described below for training a machine learning model can be applied to any set of training images, regardless of whether the training images are collected based on a defined target audience.

In some implementations, the raw image data from the training dataset can be input into a machine learning model to train the machine learning model. For example, the machine learning model can be a neural network or other machine learning model implemented by the machine learning module 114. However, attempting to train such a model by using the raw image data can be computationally inefficient, and may require that the training dataset be very large in order to effectively train the model. To overcome this technical challenge, lower-level features of the images, rather than the images themselves, can be used to train the model.

Figure 2:
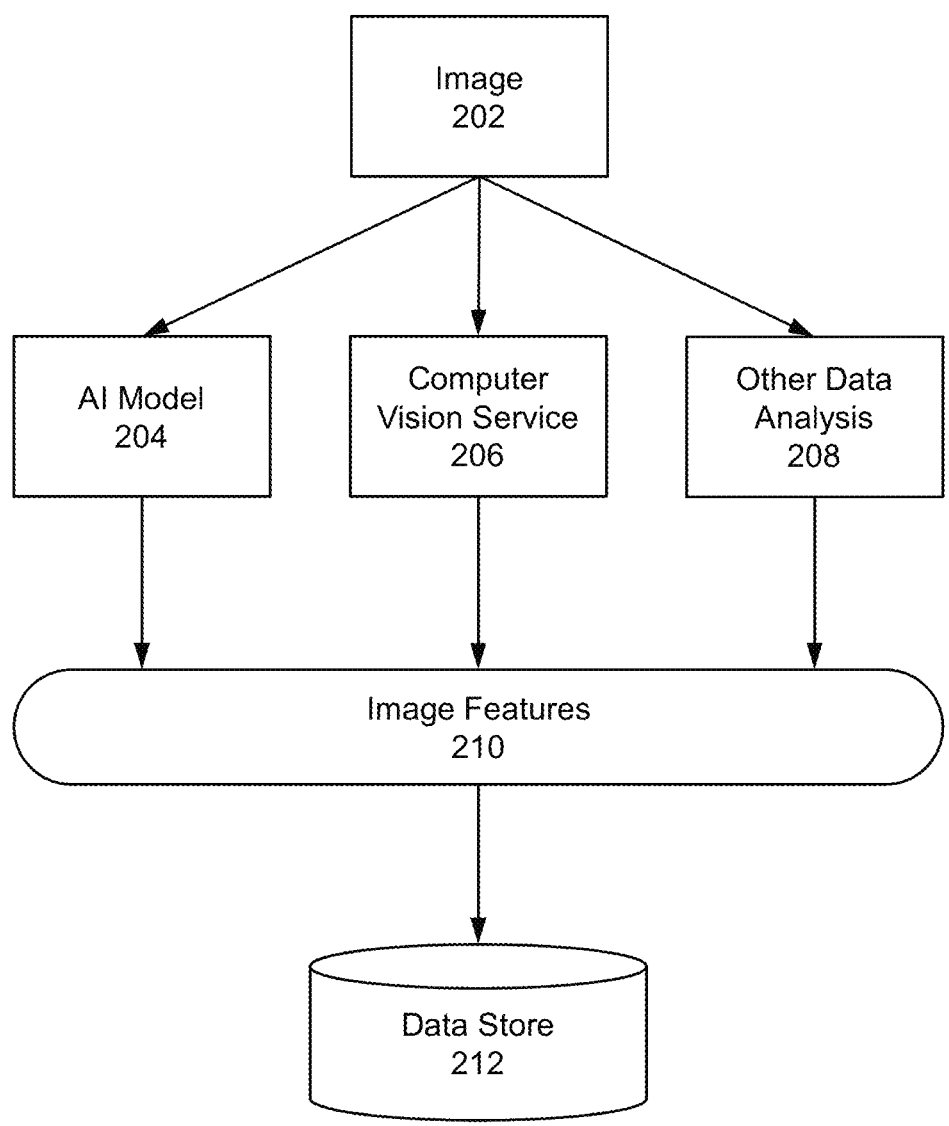
FIG. 2 illustrates data flow in a process for extracting features from images, in accordance with one or more implementations.

FIGS. 2-5 depict processes for extracting features from images, training a machine learning model, and using the trained model to generate a performance score for a candidate image. The processes depicted in FIGS. 2-5 can be implemented, for example, by the server 102 of FIG. 1. Thus, FIGS. 2-5 are described below with reference also to FIG. 1. Referring now to FIG. 2, the data flow in a process 200 for extracting features from images is illustrated, in accordance with one or more implementations. The process 200 can be performed, for example, by the image feature manager 110 of FIG. 1. It should be understood that, while FIG. 2 shows feature extraction for a single image 202, the process 200 can be repeated for any or all images in the training dataset. The process 200 can include using one or more artificial intelligence models 204, one or more computer vision services 206, and other data analysis techniques 208 to extract features from the image 202.

In some implementations, the image feature manager 110 can implement the one or more artificial intelligence models 204, the one or more computer vision services 206, and the other data analysis techniques 208. For example, the one or more artificial intelligence models 204, the one or more computer vision services 206, and the other data analysis techniques 208 can each include an artificial neural network that includes nodes arranged in a plurality of layers. Each node can be a computational unit, which may also be referred to as an artificial neuron. The layers can be arranged sequentially such that a node receives an input signal from one or more of the nodes in the previous layer, processes the input according to a function to produce an output, and transmits the output to one or more nodes of the next layer. The first layer of such a network can be referred to as an input layer, and can receive the raw image data (e.g., data corresponding to each individual pixel of the image 202). The final layer can be referred to as an output layer. Thus, the image data for the image 202 can be propagated through the layers of an artificial neural network to cause the artificial neural network to produce one or more outputs at each layer of the artificial network, including the final or output layer.

In some implementations, any of the one or more artificial intelligence models 204, the one or more computer vision services 206, and the other data analysis techniques 208 can be a detection network. For example, a detection network can be configured to determine a presence or absence of one or more predetermined characteristics of the image 202, such as the features of a scene depicted in the image 202, the features of objects depicted in the image 202, a color or colors most prevalent in the image 202, etc. Each such network can be used to extract a respective set of image features 210 from the image 202. Thus, a scene detection network can be used to extract a set of scene features from the image 202, an object detection network can be used to extract a set of object features from the image 202, etc.

In some implementations, the image feature manager 110 can use the outputs of an intermediate layer of an artificial neural network corresponding to any of the one or more artificial intelligence models 204, the one or more computer vision services 206, and the other data analysis techniques 208. An intermediate layer can be any layer between the input layer and the output layer. Thus, while a detection network may have an output layer that outputs a binary signal (e.g., indicating presence or absence of a particular trait in the image 202), the outputs of intermediate layers also can be relevant to image features 210 in the image 202. In some implementations, these intermediate outputs can be mathematically descriptive of the image 202 itself. In some implementations, the image feature manager 110 can extract the image features 210 based on the outputs of an intermediate layer of an artificial neural network (e.g., any of the one or more artificial intelligence models 204, the one or more computer vision services 206, and the other data analysis techniques 208), which may be represented as a vector, a tensor, or any other form of information.

The image features 210 that can be extracted from the image 202 by the image feature manager 110 are not limited to object, scene, or color features. For example, the features extracted from the image 202 can be or can include any stylistic features that may relate to any visual characteristic of an image, such as layout, position, symmetry, balance, arrangement, composition, pixel intensity, contrast, blurriness, object location, depth of field, angle of view, focal point, view point, vantage point, foreground/background content, white space/negative space, cropping, framing, color scheme, hue, tint, temperature, tone, saturation, brightness, shade, mood, line, angles, noise, contours, gradients, texture, repetition, patterns, blowout, blooming, concentricity, cubic attributes, geometric attributes, shadow, blocked shadow, vignetting, scale, number of objects, position of objects, spatial context, proportion, shapes, shape of objects, number of shapes, attributes of objects, form, perspective, representation, path, scenery, time of day, exposure, time lapse, typography, position of headline, size of headline, length of text, location of call-to-action, typeface, font, location of faces, posture/pose of people, location of figures, gestures, action/activities of people, number of people, hair color of people, ethnicity of people, gender of people, age of people, expressions and emotions of people, facial attributes, clothing and appearance, accessories, resolution, orientation, icons, emojis, logos, watermarks, etc. It should be understood that this list of attributes is exemplary only and should be not read as limiting the scope of this disclosure.

Other types of features of the images in the training dataset also can be extracted from the image 202. It should be understood that while the image features 210 are depicted as a single entity in FIG. 2 for illustrative purposes, in some implementations separate sets of image features 210 may be extracted by each of the one or more artificial intelligence models 204, the one or more computer vision services 206, and the other data analysis techniques 208. The image feature manager 110 can process these separate sets of features, for example by altering a format of the feature sets or combining the feature sets, to produce the image features 210. The image feature manager 110 can store the image features 210 in a data store 212. In some implementations, the data store 212 can correspond to electronic storage 146 of FIG. 2.

Figure 3:
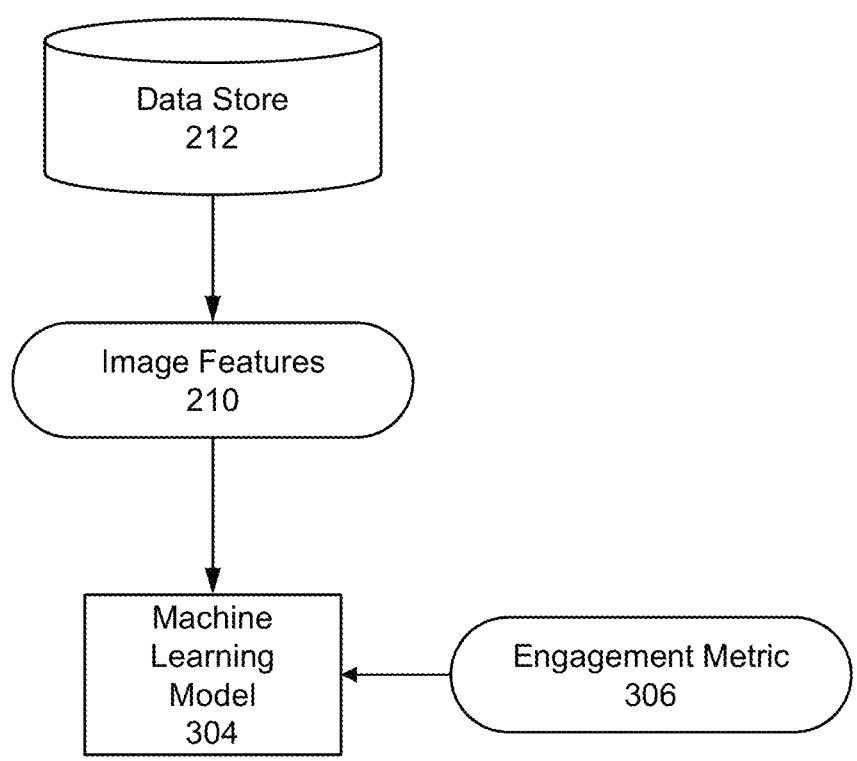
FIGS. 3, 4A, and 4B illustrate data flow in a process for training a machine learning model, in accordance with one or more implementations.
Figure 4A:
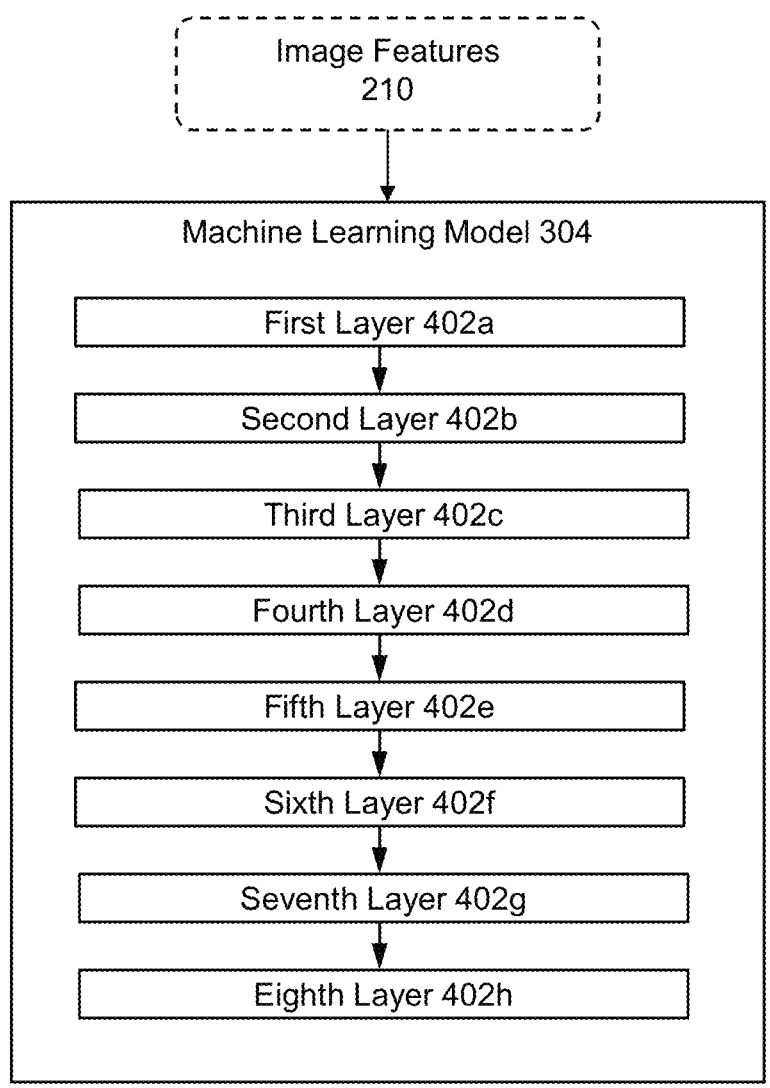
Figure 4B:
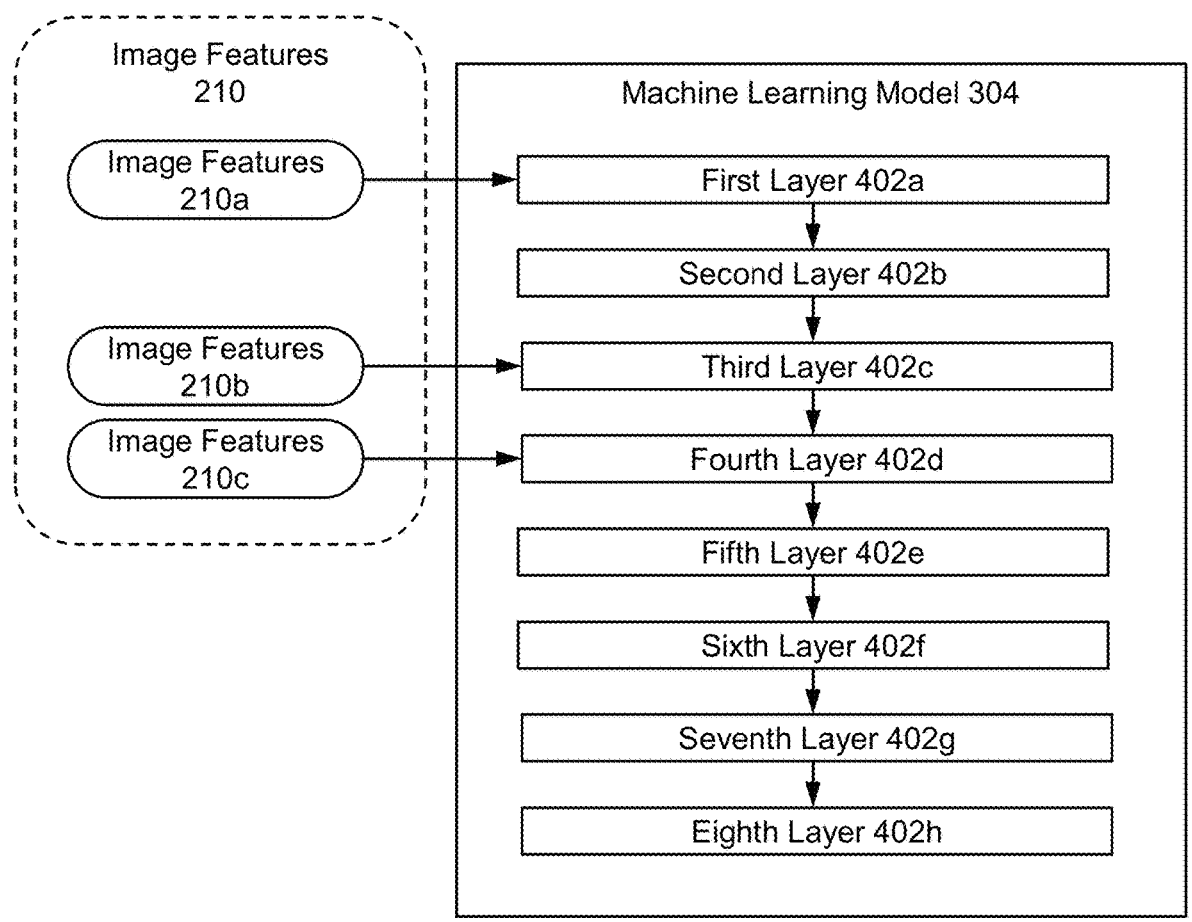

FIGS. 3, 4A, and 4B illustrate data flow in processes for training a machine learning model, in accordance with one or more implementations. The process 300 of FIG. 3, the process 400 of FIG. 4A, and the process 404 of FIG. 4B can make use of the image features 210 extracted in the process 200 of FIG. 2. For example, as shown in FIG. 3, the image features 210 can be retrieved from the data store 212 and introduced into a machine learning model 304. In some examples, the machine learning model 304 can be an artificial neural network, similar in structure to those described above. For example, the machine learning model 304 can include a plurality of nodes or artificial neurons arranged in sequential layers. FIGS. 4A and 4B show the layered structure of the machine learning model 304, which includes layers 402a-402h. The first layer 402a can serve as an input layer, the eighth layer 402h can serve as an output layer, and the remaining layers 402b-402g can be intermediate layers. In some examples, the intermediate layers 402b-402g can be referred to as hidden layers, because their outputs are typically abstracted from outside of the machine learning model 304.

In one example technique for training the machine learning model 304, an "end-to-end" approach can be used. For example, as illustrated in the process 404 of FIG. 4A, in an end-to-end approach, all of the image features 210 can be introduced at the input layer 402a of the machine learning model 304 and can be propagated through each layer 402 of the machine learning model 304. Stated differently, all of the image features 210 can be introduced at the input layer 402a, causing all of the nodes in that layer to produce output signals that are transmitted to the second layer 402b. This process is repeated as successive layers 402 of the machine learning model 304. Thus, all the image features 210 for a given image are propagated through the layers 402 of the machine learning model 304 as part of the training process for the machine learning model 304. In some implementations, some of all of image features 210 can be propagated from earlier layers 402 (e.g., layers closer to the input layer 402a) to later layers (e.g., layers 402 closer to the output layer 402h). This may be referred to as forward propagation. In some other implementations, some or all of the image features 210 can be propagated from later layers 402 to earlier layers 402 (e.g., back propagation). The machine learning model 402a can be trained based on the image features 210 for each image, along with a corresponding engagement metric 306 for the image, in order to train the machine learning model 304 to learn to produce predicted engagement metrics for images based on features extracted from those images (e.g., a difference between predicted engagement metrics and the engagement metric 306 may be back-propagated through the machine learning model 304 according to a loss function). A predicted engagement metric can also be referred to as a performance score for the image. In another example of an end-to-end approach, the raw image data itself (rather than the extracted image features 210) for the training data set can be introduced at the input layer 402a of the machine learning model 304.

In some implementations, using an end-to-end approach can be simple. However, the machine learning model 304 may produce inaccurate results if trained in this manner. For example, because of the wide variety of features included in visual content and diverse tastes across different target audiences, the search space (i.e., the diverse number of image attributes and characteristics) for this training task can be very large. As a result, accurately training the machine learning model 304 in this manner can require a massive set of training images. Training images can be difficult to gather for a given target audience, as described above, and therefore a sufficiently large set of training images may not be available. In addition, an end-to-end approach would require a very large architecture (e.g., a large number of nodes in each layer 402, each of which processes the entire volume of image data in the set of training images) and may yield unsatisfactory results.

To address these challenges, the process 404 of FIG. 4B shows an alternative to the end-to-end approach that may be more computationally efficient and can result in an accurately trained machine learning model 304 with a smaller training dataset. As shown, the image features 210 can be divided into subsets of image features 210a, 210b, and 210c. Generally, the subsets of image features 210a, 210b, and 210c can be non-overlapping with one another. In some implementations, the subsets of image features 210a, 210b, and 210c can be grouped according to categories or types of features, such as object features, scene features, color features, etc. The subsets of features 210a, 210b, and 210c can be introduced into the machine learning model 304 at different layers selected to optimize or improve the training of the machine learning model 304 relative to an end-to-end approach.

Introducing the extracted image features 210 into the machine learning model 304 in this way can help to guide the machine learning model 304 to evaluate images in predefined directions. For example, the machine learning model 304 can be provided with information regarding the factors that contribute to a human's judgment of images, thereby training the machine learning model 304 to evaluate images in a manner similar to that of the humans who make up the target audience. As a result, the search space can be reduced to a more manageable complexity, and training can be accomplished with a smaller set of training data.

In some implementations, larger subsets of image features 210 can be introduced at earlier layers of the machine learning model 304 (i.e., layers closer to the input layer), while smaller subsets of image features 210 can be introduced at later layers of the machine learning model 304 (i.e., layers closer to the output layer). This approach can help to ensure that the smaller subsets of features are considered by the machine learning model 304 and are not overwhelmed by larger subsets of features. In an example, the subset of image features 210a can be or can include object features (e.g., features that relate to types of objects included in an image). In some implementations, the subset of image features 210a can optionally also include scene features. For example, a vector or tensor representing the object features can be combined with a vector or tensor representing scene features, such as by concatenating the two vectors or tensors. The combined vectors or tensors can be the subset of image features 210a. Object features and scene features can be relatively important factors in evaluating an image, and the associated datasets can be relatively large. For these reasons, the subset of image features 210a can be introduced into the first layer 402a of the machine learning model 304.

Continuing with this example, the subset of image features 210b can include color features. In some implementations, color features may be less important to an evaluation of an image than object features or scene features and can therefore be introduced into the machine learning model 304 downstream from the input layer 402a. In the example of FIG. 4B, the subset of image features 210b can be introduced at the third layer 402c. The subset of image features 210c can include all other features extracted from the image (e.g., any image feature not categorized as an object feature, a scene feature, or a color feature) and can be introduced downstream from the point of introduction for the subset of features 210b, for example in the fourth layer 402d. This arrangement can be more efficient than the alternatives (e.g., an end-to-end arrangement), as it reduces the computational cost and the data requirement for the training. Higher efficiency is the result of providing the machine learning model 304 with extra information regarding the features that form human's perception of the performance of an image.

The problem of predicting a performance score representing the likely performance of an image can be a regression problem. However, due to the high complexity of such a regression problem, it may be difficult to achieve accurate results using only a regression layer at the output of the machine learning model 304 (e.g., the eighth layer 402h). To address this technical challenge, in some implementations, the accuracy of this regression problem can be improved by defining two loss functions that are trained according to the training dataset. A first loss function can be used one to guide the machine learning model 304 to learn the rough prediction of scores. For example, a rough or coarse prediction can be determined using a classification layer as one of the plurality of layers 402 of the machine learning model 304. The classification layer can be trained to determine probabilities for each of a plurality of ranges of performance scores for an image. For example, a performance score can be an integer value from 1 to 100, with higher values indicating better predicted performance. The classification layer of the machine learning model 304 can be trained to determine probabilities for discrete subranges within the entire possible range, such as a first probability that the performance score is between 1 and 10, a second probability that the performance score is between 11 and 20, a third probability that the performance score is between 21 and 30, etc. This example is illustrative only and should not be viewed as limiting. In other examples, the classification layer of the machine learning model 304 can be trained to determine probabilities for other subranges. For example, the classification layer of the machine learning model 304 can be trained to determine probabilities for two subranges, such as a first probability that the performance score is "low" (e.g., between 1 and 50) and a second probability that the performance score is "high" (e.g., between 51 and 100).

A second loss function can also be defined to learn a more accurate final score, based on the rough or coarse range determined by the classification layer. In some implementations, the second loss function can be implemented by a regression layer downstream from the classification layer. Thus, the overall loss function for the machine learning model 304 can be a combination of the classification loss and the regression loss. The classification loss function can help to guide the model through the coarse range of scores, while the regression loss function is responsible for identifying one particular performance score (e.g., a single integer value) based on the probabilities identified by the classification layer. In such an example, the final layer (i.e., the eighth layer 402h as shown in FIGS. 4A and 4B) can be the regression layer, and the layer immediately upstream from the final layer (e.g., the seventh layer 402g as shown in FIGS. 4A and 4B) can be the classification layer. In some other implementations, the machine learning model 304 can have only a classification layer without a regression layer, or only a regression layer without a classification layer, or only output a feature embedding.

It should be appreciated that the particular arrangements described here and depicted in FIGS. 4A and 4B are illustrative only and represents only one example. In other implementations, the machine learning model 304 may have a different structure without departing from the scope of this disclosure. For example, the machine learning model 304 may have more or fewer layers than are depicted in FIGS. 4A and 4B. In addition, the image features 210 may be divided into more or fewer subsets than are depicted in FIGS. 4A and 4B, and each subset can be introduced at a different layer than depicted in FIGS. 4A and 4B, without departing from the scope of this disclosure.

FIGS. 3, 4A, and 4B show the general approach for propagating image features 210 for a single image 202 through the layers of the machine learning model 304 in order to train the model. It should be appreciated that these processes may be repeated with image features 210 from the other images 202 in the training dataset, along with their corresponding normalized engagement metrics, to train the machine learning model 304. In some examples, all of the image features 210 for all of the images in the training dataset also can be used to train additional variants of the machine learning model 304 in a similar manner. For example, additional variants of the machine learning model 304 can be structurally similar to what is depicted in FIGS. 4A and 4B but may be configured to apply different weights to different subsets of the image features 210 for training purposes.

Figure 5A:
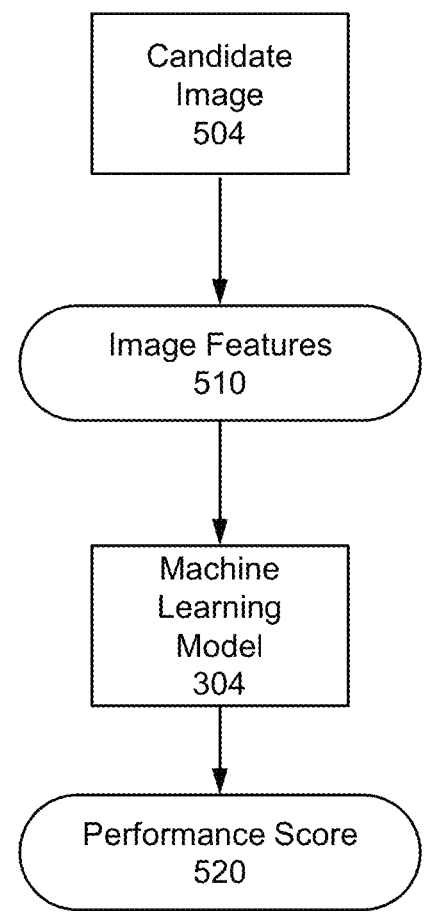
FIG. 5A illustrates data flow in a process for generating a performance score for an image, in accordance with one or more implementations.

FIG. 5A illustrates data flow in a process 500 for generating a performance score for a candidate image 504, in accordance with one or more implementations. In some implementations, the process 500 can be performed by the performance score manager 112 of FIG. 1. The process 500 can make use of the machine learning model 304 that has been trained according to the processes 300, 400, and 404 shown in FIGS. 3, 4A, and 4B, respectively. The candidate image can be any image whose likely performance among a target audience is of interest. For example, a user of one of the client computing platforms 104 may submit the candidate image 504 for scoring prior to publishing the candidate image 504. In some implementations, a user may submit more than one candidate image 504 and each candidate image 504 can be scored separately, so that the predicted performance of each candidate image 504 can be compared to the others.

In some implementations, data flow for scoring the candidate image 504 can be similar to data flow for training the machine learning model 304 with each image of the training data. For example, rather than processing the raw image data (e.g., pixel data) for the candidate image 504 using the machine learning model 304, a set of image features 510 can first be extracted from the candidate image 504. In some implementations, the image features 510 can be extracted from the candidate image 504 using the same or similar techniques described above for extracting the image features 210 from an image 204. For example, as show in FIG. 2, one or more AI models 204, one or more computer vision services 206, and other data analysis techniques 208 can be used to extract features from the candidate image 504. In some implementations, the one or more AI models 204, the one or more computer vision services 206, and the other data analysis techniques 208 may be or may include artificial neural networks having layered structures, and features may be extracted from intermediate layers of these artificial neural networks.

In some implementations, the performance score manager 112 can propagate the image features 510 of the candidate image 504 through the trained machine learning model 304. For example, the image features 510 of the candidate image 504 can be introduced and propagated through the layers of the machine learning model 304 in the same manner or a similar manner used for training of the machine learning model 304. Thus, the image features 510 can be divided into subsets of image features, and each subset can be introduced at a different layer of the machine learning model 304. For example, the image features 510 can be grouped into smaller subsets according to categories or types of features, such as object features, scene features, color features, etc. The subsets of the image features 510 can be introduced into the machine learning model 304 at different layers selected to optimize or improve the training of the machine learning model 304 relative to an end-to-end approach.

The trained machine learning model 304 can process the image features 510 of the candidate image 504 to generate a performance score 520 for the candidate image. In some implementations, the performance score 520 can be selected from among a plurality of possible performance scores (e.g., an integer value within a predetermined range, a decimal value between 0 and 1, etc.). The performance score 520 can be determined by the machine learning model 304 based on both a classification analysis and a regression analysis, as described above. In some implementations, the process 500 can also be repeated using one or more variants of the machine learning model 304, each of which may calculate a respective performance score 520. In some implementations, the performance score manager 112 can be configured to select an overall performance score based on any number of performance scores 520 calculated by different variants of the machine learning model 304. For example, the performance score manager 112 can be configured to select the overall performance score as an average of the performance scores 520 calculated by a plurality of variants of the machine learning model 304.

Figure 5B:
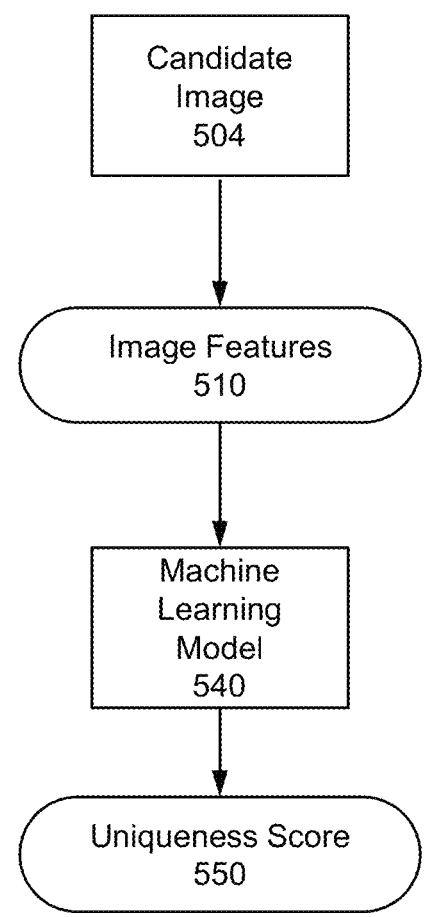
FIG. 5B illustrates data flow in a process for generating a uniqueness score for an image, in accordance with one or more implementations.

FIG. 5B illustrates data flow in a process 530 for generating a uniqueness score for the candidate image 504, in accordance with one or more implementations. In some implementations, the process 530 can be performed by the performance score manager 112 of FIG. 1. The process 530 can make use of a machine learning model 540 that has been trained to determine uniqueness scores for individual image or any other content items. For instance, the machine learning model 540 may be or include one or more generative Gaussian mixture models (GMM). A GMM is a probabilistic model that assumes that data is generated from a limited number of Gaussian distributions. In this application, each of the Gaussian distributions may represent one type of content. For example, one Gaussian distribution may represent sneakers with simple backgrounds, and another Gaussian distribution may represent lifestyle images illustrating a person running in those sneakers. Gaussian distributions can represent any type of content. The machine learning model 540 may be trained by extracting features from content items and adding the extracted features to Gaussian distributions of content types of the images. The machine learning model 540 may add features from any number of images to such Gaussian distributions to generate a trained Gaussian mixture model.

To generate a uniqueness score for the candidate image 504, the image features 510 may be extracted from the candidate image 504 and inserted into the machine learning model 540. Based on the image features 510, the GMM model can predict the log-likelihood of each sample belonging to the training data. A uniqueness score 550 for the candidate image 504 can be determined (e.g., by performance score manager 112) as being inversely proportional to the log-likelihood of the candidate image 504 compared to the images that were used to train the GMM model.

In other embodiments, instead of using a GMM to determine a uniqueness score for an image (or another content item), one or more clustering machine learning models may be used. For example, machine learning model 540 may be or include outlier detection or clustering algorithms (e.g., k-nearest neighbor, k-means clustering, etc.) that is trained by inserting points on a multi-dimensional graph that represent the features of different input training images. The image features 510 of candidate image 504 may be inserted into the machine learning model 540 and a distance may be determined between a point representing the image features 510 and the training data. The distance may be the same as or may be proportional to a uniqueness score 550 for the candidate image 504.

Figure 5C:
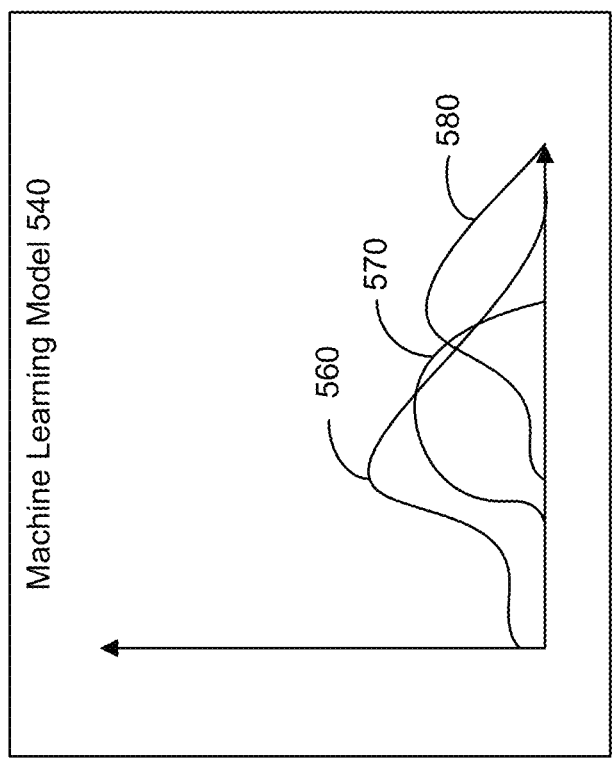
FIG. 5C illustrates an example Gaussian distribution model for determining a uniqueness score for an image, in accordance with one or more implementations.

FIG. 5C illustrates machine learning model 540 as an example Gaussian mixture model. The Gaussian mixture model may include one or more Gaussian distributions 560, 570, and/or 580 that each include data points for determining a uniqueness score of an image, in accordance with one or more implementations. The Gaussian mixture may include any number of Gaussian distributions. Each of the Gaussian distributions may include data for a specific type of content. For example, Gaussian distribution 560 may include a distribution of images that include a camping tent, Gaussian distribution 570 may include a distribution of images that include s'more cooking materials, and Gaussian distribution 580 may include a distribution of images that include a starry night. Machine learning model 540 may compare any candidate images to Gaussian distributions 560, 570, and/or 580 to determine log-likelihoods of the candidate images compared to the images that were used to train machine learning model 540. As described above, the log-likelihoods for the candidate images may be determined to be inversely proportional to the uniqueness scores for the respective candidate images. Machine learning model 540 may output the log-likelihoods, or scores that are inversely proportional to the log-likelihoods, to indicate the uniqueness of the images compared to the training images that were used to generate Gaussian distributions 560, 570, and/or 580.

Figure 6:
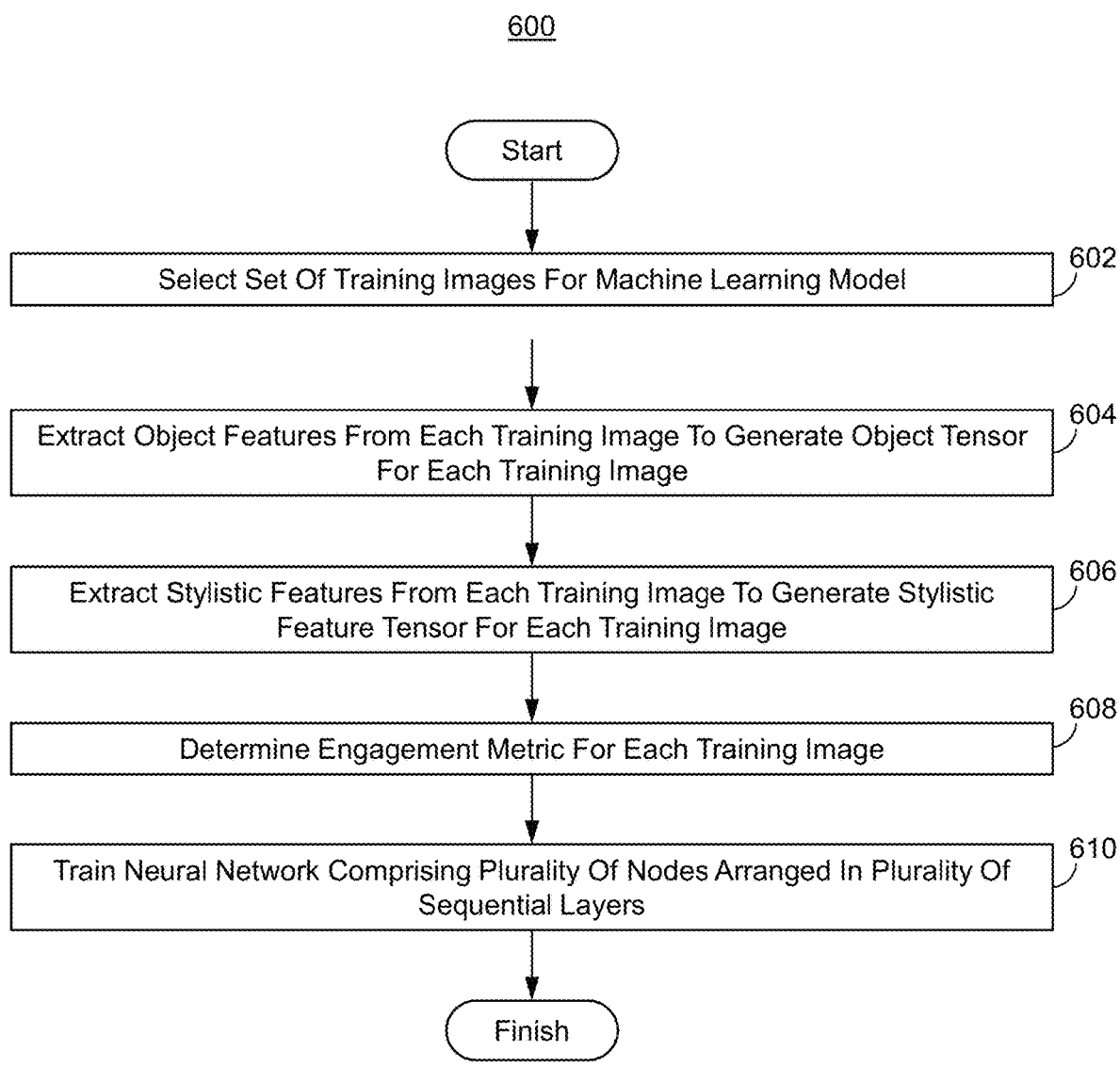
FIG. 6 illustrates a method for training a machine learning model, in accordance with one or more implementations.

FIG. 6 illustrates a method 600 for training a machine learning model, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information), such as the server 102 of FIG. 1. The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

An operation 602 may include selecting a set of training images for a machine learning model. Operation 602 may be performed by one or more hardware processors configured by machine-readable instructions including a module that is the same as or similar to the training data manager 108, in accordance with one or more implementations. In some implementations, a target audience can be identified. In some implementations, the set of training images can be selected based at least in part on such a target audience.

An operation 604 may include extracting object features from each training image to generate an object tensor for each training image. Operation 604 may be performed by one or more hardware processors configured by machine-readable instructions including a module that is the same as or similar to the image feature manager 110, in accordance with one or more implementations.

An operation 606 may include extracting stylistic features from each training image to generate a stylistic feature tensor for each training image. Operation 606 may be performed by one or more hardware processors configured by machine-readable instructions including a module that is the same as or similar to the image feature manager 110, in accordance with one or more implementations.

An operation 608 may include determining an engagement metric for each training image. The engagement metric corresponding to a performance score. Operation 608 may be performed by one or more hardware processors configured by machine-readable instructions including a module that is the same as or similar to the training data manager 108, in accordance with one or more implementations.

An operation 610 may include training a neural network including a plurality of nodes arranged in a plurality of sequential layers. Training the neural network may include propagating information included in the object tensor for each training image through each layer of the neural network including an input layer and propagating information included in the style tensor for each training image through a subset of the layers of the neural network not including the input layer. The layers of the neural network may include at least a classification layer to determine probabilities for each of a plurality of ranges of performance scores for a candidate image. Operation 610 may be performed by one or more hardware processors configured by machine-readable instructions including a module that is the same as or similar to the training data manager 108, in accordance with one or more implementations.

Implementing Session Cookies for Content Selection

As previously mentioned, online content providers have previously relied on third-party cookies that track users' actions across the Internet to provide the users with relevant content. However, privacy concerns have caused browser companies to place restrictions on their browsers that disable the use of third-party cookie tracking. These restrictions have left content providers without any method of providing relevant content to users, and instead leaves them guessing as to which users are accessing their website and which items of content the users will appreciate the most.

To overcome the aforementioned technical deficiencies, a processor implementing the systems and methods described herein may instead use first-party cookie data that is generated as a computing device accesses a website provided by the processor. For example, the processor may establish a connection with a browser of the computing device that enables the processor to provide the computing device with a series of web pages of a website. The processor may also store in memory a series of content items that pertain to users of different target audiences that visit the website. The processor may also store target audience performance scores and target audience rankings for the content items that indicate how the content items are expected to perform with individual target audiences. When the computing device accesses the website, the computing device may request various web pages. These web pages may be associated with specific target audiences either based on the content that is shown on the web pages or target audience identifiers that the processor stores with the web pages. The processor may receive a request for a web page and/or a request for content to display on the web page via the connection. The processor may then determine a target audience for the connection with the computing device based on the web pages that the processor has previously transmitted to the computing device over the connection. After determining the target audience, the processor may select the content item that has the highest ranking for the target audience and transmit the content item to the requesting computing device with the requested web page.

Accordingly, by implementing the systems and methods described herein, a processor can provide relevant content to individual computing devices without tracking users across the Internet through third-party cookies. The processor can use the technologies that are inherent in providing users access to web pages (e.g., technologies that are useful in maintaining a logged-on state or a shopping cart) to make sure users are provided with relevant content. Because the processor performs the methods on a connection-by-connection basis instead of based on the computing device, the processor may further provide relevant content to the individual users of a group of users use the same computing device, such as a family computer at home or a public computer, further improving relevant content provision to such computing devices.

Figure 7:
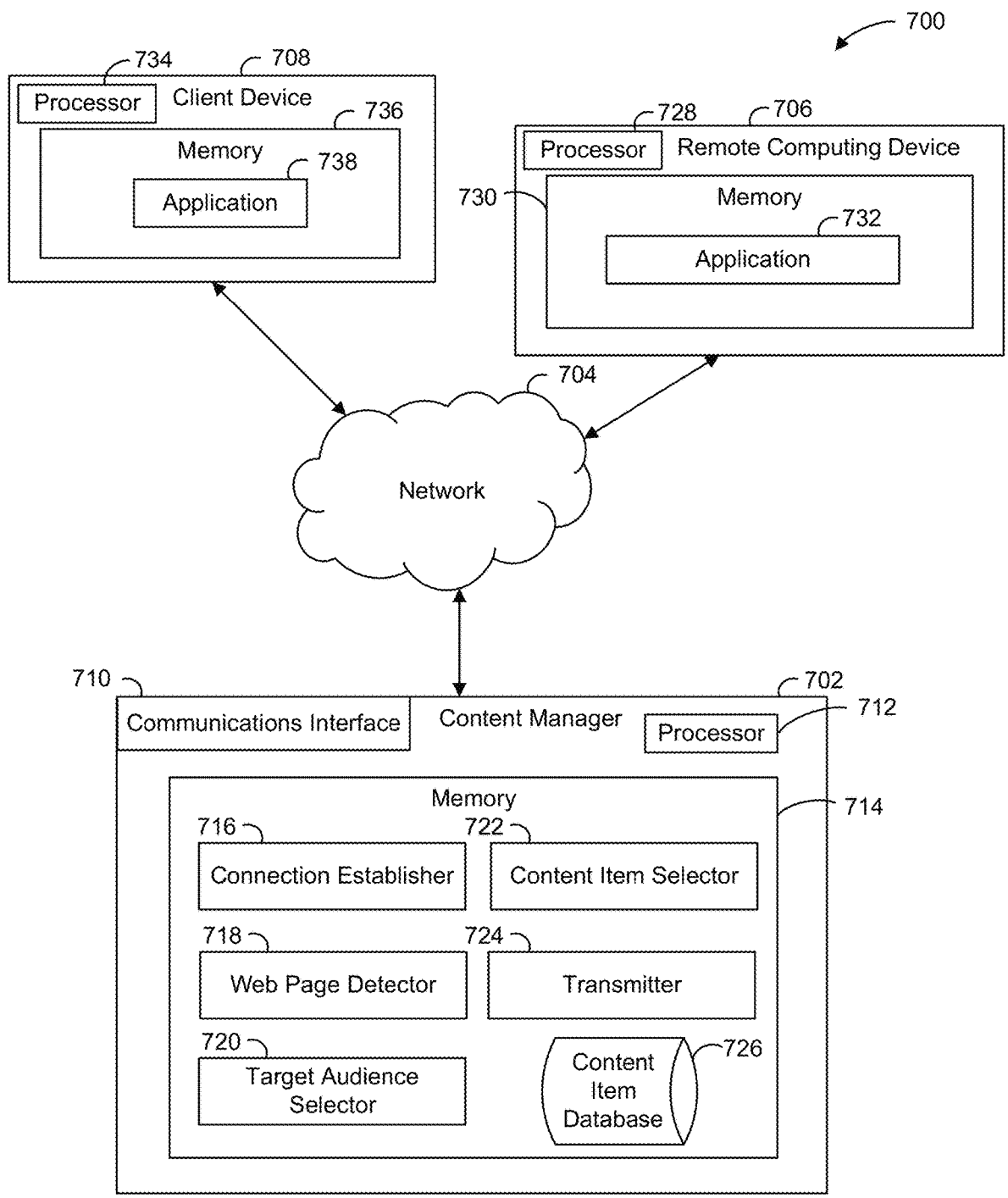
FIG. 7 illustrates a system for content selection using first-party cookie data, in accordance with one or more implementations.

FIG. 7 illustrates a system 700 for content selection using first-party cookie data, in accordance with one or more implementations. In some implementations, system 700 includes the same or similar components to system 100, shown and described with reference to FIG. 1. For example, system 700 may include a content manager 702, a network 704, which may be similar to the network in FIG. 1, a remote computing device 706, which may be similar to server(s) 102, shown and described with reference to FIG. 1, and a client device 708, which may be similar to client computing platform(s) 104, shown and described with reference to FIG. 1. Content manager 702, remote computing device 706, and client device 708 may communicate with each other over network 704.

Content manager 702 may include a communications interface 710, a processor 712, and/or a memory 714. Communications interface 710 may utilize various wired communication protocols and/or short-range wireless communication protocols (e.g., Bluetooth, near-field communication ("NFC"), HDMI, RFID, ZigBee, Wi-Fi, etc.) to facilitate communication with remote computing device and client device 708. Processor 712 may include an ASIC, one or more FPGAs, a DSP, circuits containing one or more processing components, circuitry for supporting a microprocessor, a group of processing components, or other suitable electronic processing components. In some embodiments, processor 712 may execute computer code stored in memory 714 to facilitate the activities described herein. Memory 714 may be any volatile or non-volatile computer-readable storage medium capable of storing data or computer code relating to the activities. According to an exemplary embodiment, memory 714 may include computer code modules (e.g., executable code, object code, source code, script code, machine code, etc.) for execution by processor 712. For example, memory 714 may include a connection establisher 716, a web page detector 718, a target audience selector 720, a content item selector 722, a transmitter 724, and/or a content item database 726.

Remote computing device 706 may be a computing device that stores machine learning models that are trained to generate performance scores for various content items. Remote computing device may be similar to or the same as server(s) 102. For instance, remote computing device 706 may include a processor 728 and a memory 730. Memory 730 may include an application 732. Processor 728 may process executable instructions stored in memory 730, such as executable instructions stored in application 732, to generate performance scores for content items, in some cases for different target audiences. Processor 728 may be similar to processor(s) 148, and may execute such instructions similar to how processor(s) 148 executes instructions as described with reference to FIG. 1.

Client device 708 may comprise any type and form of media device or computing device, including a desktop computer, laptop computer, portable computer, tablet computer, wearable computer, embedded computer, smart television, set top box, console, Internet of Things (IoT) device or smart appliance, or any other type and form of computing device. Computing device(s) may be referred to variously as a client, device, client device, computing device, anonymized computing device or any other such term. Computing devices and intermediary modulator may receive media streams via any appropriate network, including local area networks (LANs), wide area networks (WANs) such as the Internet, satellite networks, cable networks, broadband networks, fiber optic networks, microwave networks, cellular networks, wireless networks, or any combination of these or other such networks (e.g., network 704). In many implementations, the networks may include a plurality of subnetworks which may be of the same or different types, and may include a plurality of additional devices (not illustrated), including gateways, modems, firewalls, routers, switches, etc. Client device 708 may include a processor 734, which may be similar to processor 712. Client device 708 may also include a memory 736, which may be similar to memory 714. Memory 736 may include an application 738, which may be a browser or any application that facilitates network access and/or communication with content manager 702.

Content manager 702 may store a set of content items and ranking values for the set of content items in memory 714 (e.g., in content item database 726). The set of content items may include different images, videos, audio segments, etc. The ranking values may be values that indicate how the individual content items are predicted to perform with different individuals compared to other content items. In some embodiments, the ranking values may be target audience ranking values that indicate how the content items are predicted to perform with individuals of the specific target audience (e.g., a target audience ranking value). For example, for a content item A, content manager 702 may store a ranking value for a target audience A and a ranking value for a target audience B. The ranking values may indicate how content item A will perform with the different target audiences compared to other stored content items. Content manager 702 may store ranking values in ascending order such that content items that have a low ranking (e.g., 1) may perform better with members of a target audience compared with a content item that has a higher ranking (e.g., 10). As described herein, lower ranking values, such as one or two, may be referred to as "high or higher ranked" content items and content items that have a higher-ranking value, such as nine or 10, may be described as having a lower ranking. Content items may perform differently with different target audiences. For instance, a content item may have a low ranking with a basketball target audience but a high ranking for a clothing target audience. Thus, content manager 702 may store ranking values for multiple target audiences for the same content item in memory.

To set the ranking values, content manager 702 may determine performance scores for the different content items of the set of content items. To do so, content manager 702 may execute a machine learning model that is trained to predict performance scores, in some cases for specific target audiences. The performance scores may indicate a likelihood that a member of a target audience will interact with the content item when the content item is displayed on a web page. Content manager 702 may input the content items into the machine learning model and execute the machine learning model to obtain a performance score for each content item for a specific target audience. In some embodiments, instead of determining the performance scores locally at content manager 702, content manager 702 may transmit the content items to remote computing device 706 to similarly determine performance scores for the content items. In such embodiments, content manager 702 may transmit the content items to remote computing device 706 and remote computing device 706 may execute machine learning models trained to generate performance scores for different target audiences for each of the content items. Remote computing device 706 may transmit the content items and/or the performance scores for the content items back to content manager 702. Accordingly, content manager 702 may use artificial intelligence techniques to determine performance scores for individual content items.

After determining performance scores for individual content items, content manager 702 may assign target audience rankings to the content items. Content manager 702 may do so by comparing the performance scores for a specific target audience between the different content items of the set of content items. Content manager 702 may assign target audience ranking values to the content items based on the performance scores of the content items for specific target audiences. For instance, if the target audience is basketball, content manager 702 may identify the performance scores associated with a basketball target audience for each content item of the set. Content manager 702 may compare the identified performance scores between each other and assign ranking values to the content items in ascending or descending order based on how the performance scores for the basketball target audience compare with each other. In doing so, content manager 702 may store the target audience ranking values in a database with identifiers of the corresponding content items. Content manager 702 may similarly assign target audience ranking values to the content items for any number of target audiences.

In some embodiments, content manager 702 may update the ranking values for content items in the content item database 726 in real-time. For example, content manager 702 may execute a machine learning model using a content item that has not yet been rated as input or transmit the content item to remote computing device 706 to do the same to determine or obtain a performance score for the content item for a target audience. Upon determining or obtaining the performance score, content manager 702 may retrieve the performance scores for the target audience for content items in content item database 726 and compare the new performance scores with the previously stored performance scores. Based on the comparison, content manager 702 may determine new ranking values for the previously stored content items and a new ranking value for the new content item and store the new content item and ranking value in content item database 726. Content manager 702 may determine performance scores for any number of target audiences and update the target audience rankings for any number of target audiences in this manner.

Connection establisher 716 may comprise instructions executable by one or more processors (e.g., processor 712) to establish connections with applications (e.g., browsers) of client devices or computing devices. Connection establisher 716 may establish a connection with client device 708. Connection establisher 716 may establish the connection with application 738 of client device 708 over network 704. Client device 708 may initiate the connection using a handshaking protocol (e.g., a three-way handshaking protocol) with connection establisher 716. In doing so, application 738 of client device 708 may transmit messages to connection establisher 716 using a URL identifying a web page that is hosted by content manager 702. In some embodiments, upon establishing the connection with client device 708, connection establisher 716 may insert a session cookie into application 738 that can store information about the different web pages that client device 708 visits during the connection with connection establisher 716.

In some embodiments, upon establishing the connection with client device 708, connection establisher 716 may generate or create a session identifier for the connection. The session identifier may be a unique numeric or alphanumeric identifier that identifies the session. Content manager 702 may transmit the session identifier to client device 708 as part of the handshaking protocol. Client device 708 and/or content manager 702 may include the session identifier in any messages that they send each other such that the receiving device or devices can identify the connection to which the messages pertain.

Content manager 702 may provide one or more web pages to client device 708 over the connection. Content manager 702 may provide the web pages to client device 708 upon receiving requests identifying the web pages from client device 708. For example, upon establishing a connection with client device 708, client device 708 may request a web page from content manager 702 by sending content manager 702 a URL of the web page. A user accessing client device 708 may select various options (e.g., embedded links) on the web page that cause client device 708 to send requests for more web pages (e.g., requests including URLs for more web pages) to content manager 702 via the connection the two computing devices have established. Content manager 702 may identify the web pages that client device 708 requests from memory 714 based on the URLs in the requests and transmit the web pages back to client device 708 in response to the requests.

Content manager 702 may receive a request for a web page from client device 708. The request may include a URL of a web page that client device 708 is requesting and that content manager 702 has stored in memory 714. In some embodiments, the request may include session cookie data (e.g., a history of the web pages that client device 708 has visited during the established connection, a session identifier for the connection, etc.). Content manager 702 may receive the request over the connection that connection establisher 716 established with client device 708.

Web page detector 718 may comprise instructions executable by one or more processors (e.g., processor 712) to detect web pages that client devices request from content manager 702. In doing so, web page detector 718 may first determine if a content item is required to be transmitted to client device 708 with the requested web page. For example, upon receiving the request for the web page from client device 708, web page detector 718 may analyze the web page and search for locations on the web page that are dedicated to storing or presenting content items. In some embodiments, web page detector 718 may do so by using object recognition techniques on the web page. In some embodiments, web page detector 718 may do so by identifying an attribute (e.g., a tag or setting) of the web page in the database that stores the web page that identifies whether the web page includes a location to include a content item. If web page detector 718 determines the requested web page does not include a location to include a content item, web page detector 718 may retrieve the requested web page and transmit the web page to client device 708 over the connection.

However, if web page detector 718 determines the requested web page does include a location to include a content item, web page detector 718 may detect the web pages that client device 708 has visited during the connection. Web page detector 718 may detect the web pages that client device 708 has visited during the connection based on session cookie data that client device 708 included in the request for a web page. For instance, in embodiments in which client device 708 includes a history of the web pages that client device 708 has visited during the established connection in the request for a web page, web page detector 718 may identify the web pages from the history. In some embodiments, instead of relying on session cookie data, web page detector 718 may instead maintain a record of web pages web page detector 718 has served client device 708 over the connection. For example, upon establishing a connection with client device 708, web page detector 718 may store an identifier of client device 708 and/or the connection with client device 708 in memory (e.g., the session identifier for the connection). At each instance web page detector 718 receives a request for a new web page and/or transmits a requested web page to client device 708, web page detector 718 may store an indication of the requested and/or transmitted web page in memory 714 with the identifier of client device 708 and/or the connection.

Target audience selector 720 may comprise instructions executable by one or more processors (e.g., processor 712) to determine and select target audiences that are associated with established connections. Target audience selector 720 may determine a target audience for a connection based on the web pages that web page detector 718 detected. Target audience selector 720 may determine the target audience for the connection based on the subject matter of the detected web pages that client device 708 has visited via client device 708's connection with target audience selector 720 or based on identifiers of the web pages. For instance, in some embodiments, target audience selector 720 may analyze the web pages that target audience selector 720 has served client device 708 during the connection. Target audience selector 720 may do so by extracting items or objects from the web pages using object recognition techniques of the visual content of the web page or using natural language processing techniques on the source code of the web pages. Target audience selector 720 may identify different objects or items on the web pages using such techniques and compare strings identifying the objects or items to a database (e.g., a relational database storing relationships between items or objects and target audiences) to identify if there are any matching strings in the database. If target audience selector 720 is able to identify a matching string for an object or item, target audience selector 720 may identify a target audience that corresponds to (e.g., has a stored relationship with) the matching string. Target audience selector 720 may determine the target audience for the connection to be the identified target audience with the matching string.

In some instances, target audience selector 720 may identify multiple target audiences that match the objects or items that have been displayed on served web pages. When this occurs, target audience selector 720 may maintain counters for the different target audiences that target audience selector 720 may increment for each instance an object or item has a match with a string in the database. In such instances, target audience selector 720 may determine the target audience for the connection by identifying the target audience that has the highest count of the counters. In some embodiments, target audience selector 720 may determine a predefined number of target audiences (e.g., a number of target audiences exceeding one) for a connection. In such embodiments, target audience selector 720 may identify the predefined number of the highest counts to determine the target audiences for the connection.

In some embodiments, target audience selector 720 may compare items or objects on the requested web page to the database in memory 714. For example, target audience selector 720 may analyze and extract objects or items from the web page that client device 708 requests from target audience selector 720 and compare the extracted objects or items from the web page to the database. Target audience selector 720 may identify any strings in the database that match the detected objects or items from the requested web page and identify the corresponding target audience of the identified strings. Target audience selector 720 may increment the target audience counters based on the extracted objects or items that match the strings in the database in addition to the increments target audience selector 720 performs upon identifying matching strings to items or objects that were extracted from the detected web pages.

In some embodiments, instead of analyzing the items or objects that are included in the detected web pages, target audience selector 720 may evaluate identifiers of the web pages themselves to determine the target audience for the connection. For example, target audience selector 720 may store target audience identifiers for each web page that content manager 702 serves to client device 708. The target audience identifiers may indicate the target audience with which the individual web pages are associated. Target audience selector 720 may maintain counters for different target audiences. Target audience selector 720 may increment a counter each time content manager 702 serves client device 708 a web page with a target identifier for the target audience of the counter. Target audience selector 720 may identify the target audience or target audiences for the connection based on a counter or counters with the highest counts. In instances in which target audience selector 720 only detects one web page or target audience selector 720 determines (e.g., by determining each target audience identifier of the detected web pages match), target audience selector 720 may avoid the processing requirements of maintaining and analyzing counters and instead just identify the target audience for the connection based on the target audience identifier of the detected web page or web pages.

In some embodiments, target audience selector 720 may compare the target audience identifier of the requested web page to the database. For example, in addition to incrementing the counters based on target audience identifiers of detected web pages, target audience selector 720 may extract a target audience identifier of the requested web page from memory and increment the counter corresponding to the target audience identifier of the requested web page. Thus, target audience selector 720 may have the additional information from the requested web page in addition to the information from the detected previously accessed web pages to more accurately determine a target audience for a connection.

After determining a target audience for the connection, target audience selector 720 may determine if content manager 702 has previously transmitted a content item to client device 708 over the connection. For example, target audience selector 720 may store a list of content items that target audience selector 720 has transmitted to client device 708 over network 704. Target audience selector 720 may generate the list with a stored association with the session identifier for the connection between client device 708 and content manager 702. Target audience selector 720 may initialize the list to have zero content items upon creation of the connection for the list. Then, as content manager 702 transmits content items to client device 708 over the connection, target audience selector 720 may add identifiers of the transmitted content items to the list. Thus, target audience selector 720 may maintain an active list of the content items content manager 702 has transmitted over the connection with client device 708.

Content item selector 722 may comprise instructions executable by one or more processors (e.g., processor 712) to determine and select content items based on the content items being associated with the same target audiences as a connection and having a high-ranking value. Before selecting a content item to transmit to client device 708 with the requested web page, content item selector 722 may determine if content manager 702 has previously sent client device 708 the content item over the connection. Content item selector 722 may do so by identifying the list that content manager 702 has stored for the connection with client device 708. Content item selector 722 may determine the number, if any, of content items content manager 702 has previously transmitted to client device 708 over the connection by identifying the number of content items on the list of content items. To do so, content item selector 722 may maintain a counter for the list and increment the counter for each content item identified on the list. In some embodiments, target audience selector 720 may maintain a counter of the number of content items content manager 702 has transmitted over the connection and increment the counter for each content item transmission.

If content item selector 722 determines content manager 702 has not served any content items to client device 708, content item selector 722 may select the content item that is associated with the highest-ranking value in content item database 726. In some embodiments, content item selector 722 may select the content item with the highest-ranking value for the target audience (e.g., highest target audience ranking value) that content item selector 722 determined for the connection. For example, content item selector 722 may receive a request over a connection for a web page including a location for a content item and determine a target audience for the connection is basketball. Content item selector 722 may then identify a set of content items from the content item database that correspond to the basketball target audience. Content item selector 722 may identify and select the basketball content item that is associated with the highest-ranking value in the content item database.

However, if content item selector 722 determines content item selector 722 has transmitted one or more other content items over the connection, content item selector 722 may identify and select a content item based on the number of content items that were previously transmitted over the connection. For instance, after receiving a request for a web page over a connection and determining a target audience for the connection, content item selector 722 may identify the number of content items content manager has transmitted over the connection to client device 708. Content item selector 722 may then identify a content item based on the number. For example, if content manager 702 has transmitted four content items for basketball over the connection to client device 708, content item selector 722 may identify and select the content item with a ranking value of five (e.g., the number of content items content item selector 722 has previously transmitted plus one) from content item database 726. In doing so, content item selector 722 may avoid transmitting repetitive content to client device 708 during the same connection.

In some embodiments, content item selector 722 may further select content items based on the individual content items that content item selector 722 has previously served over the connection. Such may be the case, for example, if target audience selector 720 had previously determined client device 708 was associated with one target audience and target audience selector 720 changes the target audience determination for the connection in real-time as client device 708 accesses further web pages over the connection. For example, content item selector 722 may initially determine a connection with client device 708 being accessed by someone who enjoys cooking (e.g., a cooking target audience). Accordingly, over the course of the connection, content item selector 722 may have served a number of content items associated with the cooking target audience to client device 708 and maintain a list of the content items related to the cooking target audience that content item selector 722 has transmitted over the connection (e.g., a list with a stored association with the session identifier for the connection). However, as client device 708 requests further web pages over the connection and content manager 702 analyzes the web pages or target audience identifiers associated with the web pages, target audience selector 720 may eventually determine the target audience for client device 708 is a different target audience, such as kitchenware. Because there would likely be overlap between the content items that are associated with the cooking target audience and the kitchenware target audience (e.g., content items may be associated with identifiers of both target audiences in a database), content manager 702 may have an added criteria in which content manager 702 analyzes the content items that content manager 702 transmitted over the connection.

Continuing with the example of cooking and kitchenware target audiences above, if content manager 702 receives a request over the connection for a web page that includes a location for a content item, content item selector 722 may identify the number of content items content item selector 722 has served based only on the kitchenware target audience (any content items that are associated with cooking and kitchenware target audiences but that were selected based on the association with the cooking target audience would not be included in the count). Content item selector 722 may select the highest ranked content item associated with kitchenware if content item selector 722 has not previously selected any content items based on the cooking target audience identifier or select the content item based on the number of content items content manager 702 has transmitted over the connection based on the kitchenware target audience (e.g., select the content audience with a kitchenware target audience ranking of the number of previously transmitted content items plus one). However, if content item selector 722 determines content manager 702 has already transmitted the selected content item for the kitchenware target audience in response to another request (e.g., content item selector 722 compares the string identifying the selected content item to a list of content items content manager 702 has transmitted over the connection), content item selector 722 may increment the number of content items content item selector 722 has selected for the target audience. Content item selector 722 may accordingly select the next highest ranked content item for the target audience.

Transmitter 724 may comprise instructions executable by one or more processors (e.g., processor 712) to transmit and receive communications with client devices such as client device 708. Transmitter 724 may be or include an application programming interface of content manager 702. Transmitter 724 may transmit the selected content item to client device 708. Transmitter 724 may do so by identifying the location on the requested web page that is dedicated to storing content items for display and inserting the selected content item at the location. Transmitter 724 may then transmit the requested web page including the selected content item at the location to client device 708 to present the web page and content item on a display of client device 708.

FIG. 8 illustrates a content item database 800, in accordance with one or more implementations. Content item database 800 may be the same or similar to content item database 726, shown and described with reference to FIG. 7. Content item database 800 may be configured to store content items for a content provider, as well as data or metadata about the content items. As illustrated, content item database 800 may include columns for data about different types of content items. For instance, content item database 800 may include a content item column 802, a target audience column 804, a performance score column 806, and a ranking column 808. Content item column 802 may include identifiers of different content items. The content items may be images, videos, sounds, audio segments, or any other type of content item. The identifiers may be pointers to the content item itself such that a data processing system (e.g., content manager 702) may retrieve the content item by selecting or identifying the identifier from the content item from column 808. In some embodiments, the content item column 802 may include content items themselves. Target audience column 804 may include identifiers of target audiences that are associated with the content items that are identified in the same rows as the respective target audience identifiers. Although only one target audience is shown for each target audience, each content item may be associated with any number of target audiences (e.g., the illustrated basketball01.jpeg content may be associated with a sport target audience and a basketball target audience), either in separate data entries (e.g., rows) in content item database 800 or based on the entries in target audience column 804 each storing identifiers for multiple target audiences. The target audience identifiers of target audience column 804 may be used as keys that the data processing system can use to retrieve content that is associated with a particular target audience (e.g., the data processing system may receive a request for content items that are associated with sports and retrieve content items that have a sports target audience identifier in target audience column 804).

Content item database 800 may also store performance data (e.g., target audience performance data) for individual content items. For example, performance score column 806 of content item database 800 may include performance scores for the individual content items. The performance scores may be scores within a predefined range (e.g., a range from 1-100). The performance scores for each content item may be scores that were generated by a machine learning model that is trained to predict or generate performance scores for individual content items indicating how the content item will perform with individuals (e.g., a likelihood that an individual will interact with the content item, pay attention to the content item, etc.). The performance scores of performance score column 806 may be specific to the target audience (e.g., the performance scores may be generated by a machine learning model trained to simulate a specific target audience as target audience performance scores) or may be for the general population. Although not shown, if a content item is associated with (e.g., is in the same row as) two target audience identifiers, the row for the content item may include a performance score for each target audience, either in the same performance score column with strings identifying the target audiences with which the content items are associated, or in separate performance score columns that are dedicated to the scores for the separate target audiences.

Content item database 800 may also include ranking column 808. Ranking column 808 may include values indicating the ranking of individual content items. In some embodiments, ranking column 808 includes rankings of individual content items for specific target audiences with respect to other content items stored in the database. In such embodiments, content item database 800 may include a separate column for the rankings for each target audience. The data processing system may determine the rankings for content items for the different target audiences by comparing the performance scores of the content items for the respective target audiences. The data processing system may then, for a specific target audience, add a ranking value to the target audience ranking column for each content item identified in content item column 802. Database 800 may include a target audience ranking column for each target audience for which database 800 stores performance data and may include any number of target audience ranking columns.

Figure 9:
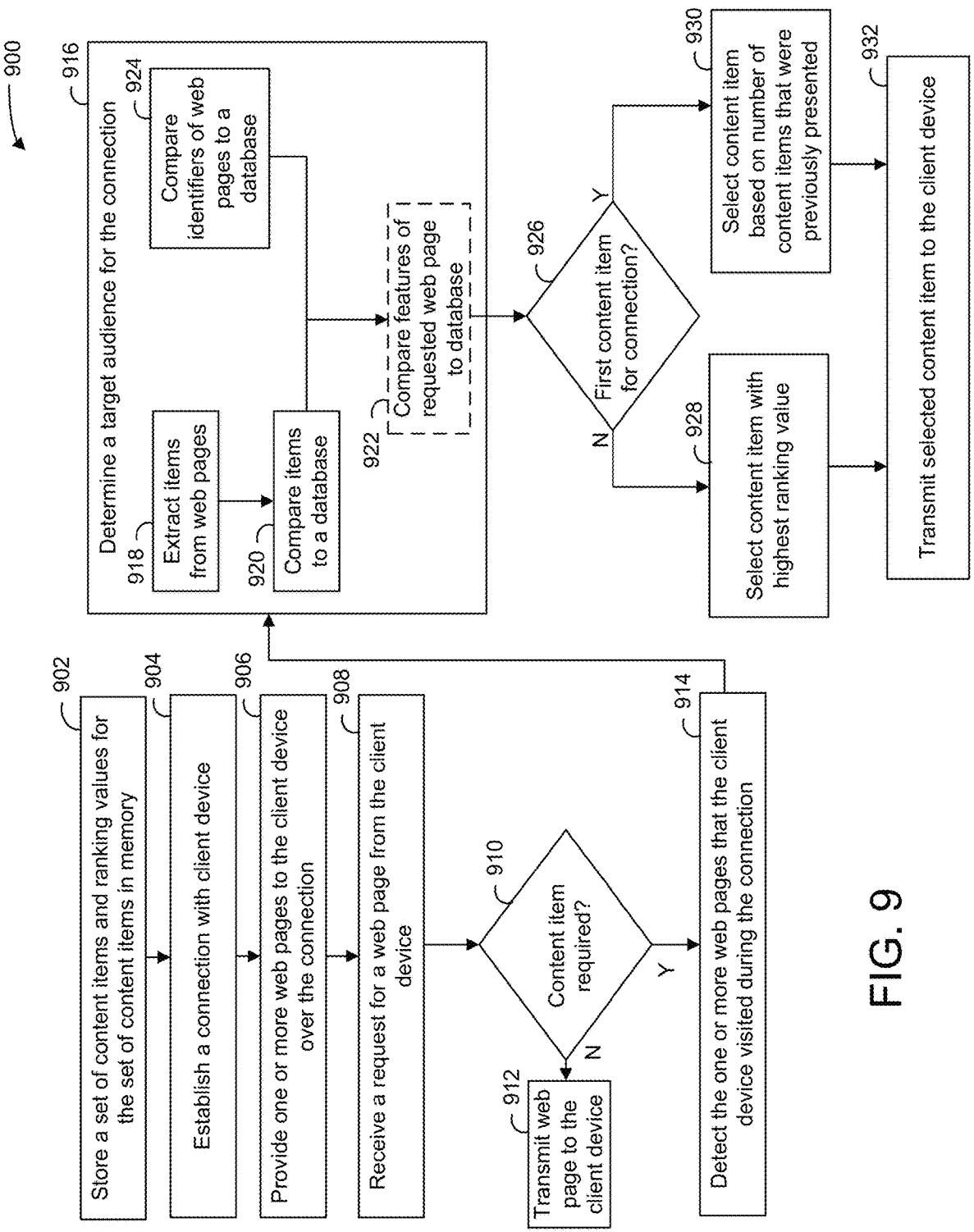
FIG. 9 illustrates a method for content selection using first-party cookie data, in accordance with one or more implementations.

FIG. 9 illustrates a method 900 for content selection using first-party cookie data, in accordance with one or more implementations. Method 900 can be performed by a data processing system (e.g., content manager 702, shown and described with reference to FIG. 7, a server system, etc.). Method 900 may include more or fewer operations and the operations may be performed in any order. Performance of method 900 may enable the data processing system to provide computing devices with content that is relevant to users accessing the computing devices without relying on third-party cookie data. Instead, the data processing system may establish a connection with a computing device via the computing device's browser and detect the different web pages the computing device visits over the connection (e.g., through the use of a session cookie). The data processing system may evaluate the detected web pages to determine a target audience of the computing device (or the connection, for example, if different individuals access the computing device at different times) and then select a content item from a database responsive to a determination the content item performs well with the target audience. The data processing system may then transmit the selected content item to the computing device over the connection for display on the browser. Thus, the data processing system may render relevant content to individuals based on detected web pages that the individuals have visited via their connections with the data processing system.

At operation 902, the data processing system stores a set of content items and ranking values for the set of content items in memory (e.g., in a content item database). The set of content items may include different images, videos, audio segments, etc. The ranking values may be values that indicate how the individual content items are predicted to perform with different individuals compared to other content items. In some embodiments, the ranking values may be target audience ranking values that indicate how the content items are predicted to perform with individuals of the specific target audience (e.g., a target audience ranking value). For example, for a content item A, the data processing system may store a ranking value for a target audience A and a ranking value for a target audience B. The ranking values may indicate how content item A will separately perform with the target audiences compared to other stored content items. The data processing system may store ranking values in ascending order such that content items that have a low ranking (e.g., 1) may perform better with members of a target audience compared with a content item that has a higher ranking (e.g., 10). As described herein, lower ranking values, such as one or two may be referred to as "high or higher ranked" content items. Content items may perform differently with different target audiences. For instance, a content item may have a low ranking with a basketball target audience but a high ranking for a clothing target audience. Thus, the data processing system may store ranking values for multiple target audiences for the same content item in memory.

To set the ranking values, the data processing system may determine performance scores for the different content items of the set of content items. To do so, the data processing system may execute a machine learning model that is trained to predict performance scores, in some cases for specific target audiences. The performance scores may indicate a likelihood that a member of a target audience will interact with the content item when the content item is displayed on a web page. The data processing system may input the content items into the machine learning model and execute the machine learning model to obtain a performance score for each content item for a specific target audience. In some embodiments, instead of determining the performance scores locally at the data processing system, the data processing system may transmit the content items to a remote device (e.g., remote computing device 706) to similarly determine performance scores for the content items. In such embodiments, the data processing system may transmit the content items to the remote computing device and the remote computing device may execute machine learning models trained to generate performance scores for different target audiences for each of the content items. The remote computing device may transmit the content items and/or the performance scores for the content items back to the data processing system. Accordingly, the data processing system may use artificial intelligence techniques to determine performance scores for individual content items.

After determining performance scores for individual content items, the data processing system may assign target audience rankings to the content items. The data processing system may do so by comparing the performance scores for a specific target audience between the different content items of the set of content items. The data processing system may assign target audience ranking values to the content items based on the performance scores of the content items for specific target audiences. For instance, if the target audience is basketball, the data processing system may identify the performance scores associated with a basketball target audience for each content item of the set. The data processing system may compare the identified performance scores between each other and assign ranking values to the content items in ascending or descending order based on how the performance scores for the basketball target audience compare with each other. In doing so, the data processing system may store the target audience ranking values in a database with identifiers of the corresponding content items. The data processing system may similarly assign target audience ranking values to the content items for any number of target audiences.

In some embodiments, the data processing system may update the ranking values for content items in the content item database in real-time. For example, the data processing system may execute a machine learning model using a content item that has not yet been rated as input or transmit the content item to the remote device to do the same to determine or obtain a performance score for the content item for a target audience. Upon determining or obtaining the performance score, the data processing system may retrieve the performance scores for the target audience for content items in the content item database and compare the new performance scores with the previously stored performance scores. Based on the comparison, the data processing system may determine new ranking values for the previously stored content items and a new ranking value for the new content item and store the new content item and ranking value in the content item database. The data processing system may determine performance scores for any number of target audiences and update the target audience rankings for any number of target audiences in this manner.

At operation 904, the data processing system establishes a connection with a client device. The data processing system may establish the connection with an application (e.g., a browser) of the client device over a network. The client device may initiate the connection using a handshaking protocol (e.g., a three-way handshaking protocol) with the data processing system. In doing so, the application of the client device may transmit messages to the data processing system using a URL identifying a web page that is hosted by the data processing system or a server of the data processing system. In some embodiments, upon establishing the connection with the client device, the data processing system may insert a session cookie into the browser that can store information about the different web pages that the client device visits during the connection with the data processing system.

In some embodiments, upon establishing the connection with the client device, the data processing system may generate or create a session identifier for the connection. The session identifier may be a unique numeric or alphanumeric identifier that identifies the session. The data processing system may transmit the session identifier to the client device as part of the handshaking protocol. The client device and/or the data processing system may include the session identifier in any messages that they send each other such that the receiving device or devices can identify the connection to which the messages pertain.

At operation 906, the data processing system provides one or more web pages to the client device over the connection. The data processing system may provide the web pages to the client device upon receiving requests identifying the web pages from the client device. For example, upon establishing a connection with the client device, the client device may request a web page from the data processing system by sending the data processing system a URL of the web page. A user accessing the client device may select various options (e.g., embedded links) on the web page that cause the computing device to send requests for more web pages (e.g., requests including URLs for more web pages) to the data processing system via the connection the two computing devices have established. The data processing system may identify the web pages that the client device requests from memory based on the URLs in the requests and transmit the web pages back to the client device in response to the requests.

At operation 908, the data processing system receives a request for a web page from the client device. The request may include a URL of a web page that the client device is requesting and that the data processing system has stored in memory. In some embodiments, the request may include session cookie data (e.g., a history of the web pages that the client device has visited during the established connection, a session identifier for the connection, etc.). The data processing system may receive the request over the connection the data processing system has established with the client device.

At operation 910, the data processing system determines if a content item is required to be transmitted to the client device with the requested web page. For example, upon receiving the request for the web page, the data processing system may analyze the web page and search for locations on the web page that are dedicated to storing or presenting content items. In some embodiments, the data processing system may do so by using object recognition techniques on the web page. In some embodiments, the data processing system may do so by identifying an attribute (e.g., a tag or setting) of the web page in the database that stores the web page that identifies whether the web page includes a location to include a content item. If the data processing system determines the requested web page does not include a location to include a content item, at operation 912, the data processing system retrieves the requested web page and transmits the web page to the client device over the connection.

However, if the data processing system determines the requested web page does include a location to include a content item, at operation 914, the data processing system detects the web pages that the client device has visited during the connection. The data processing system may detect the web pages that the client device has visited during the connection based on session cookie data that the client device included in the request for a web page. For instance, in embodiments in which the client device includes a history of the web pages that the client device has visited during the established connection in the request for a web page, the data processing system may identify the web pages from the history. In some embodiments, instead of relying on session cookie data, the data processing system may instead maintain a record of web pages the data processing system has served the client device over the connection. For example, upon establishing a connection with the client device, the data processing system may store an identifier of the client device and/or the connection with the client device in memory. At each instance the data processing system receives a request for a new web page and/or transmits a requested web page to the client device, the data processing system may store an indication of the requested and/or transmitted web page in memory with the identifier of the client device and/or the connection (e.g., the session identifier for the connection).

In some embodiments, instead of receiving a request for a web page at operation 908, the data processing system receives a request for a content item. In such embodiments, the data processing system may skip operation 910 and proceed to operation 914 to determine which content item to transmit back to the client device in response to the request.

At operation 916, the data processing system determines a target audience for the connection. The data processing system may determine the target audience for the connection based on the subject matter of the detected web pages that the client device has visited via the client device's connection with the data processing system or based on identifiers of the web pages. For instance, in some embodiments, at operation 918 the data processing system may analyze the web pages that the data processing system has served the client device during the connection. The data processing system may do so by extracting items or objects from the web pages using object recognition techniques of the visual content of the web page or using natural language processing techniques on the source code of the web pages. The data processing system may identify different objects or items on the web pages using such techniques and, at operation 920, compare strings identifying the objects or items to a database (e.g., a relational database storing relationships between items or objects and target audiences) to identify if there are any matching strings in the database. If the data processing system is able to identify a matching string for an object or item, the data processing system may identify a target audience that corresponds to (e.g., has a stored relationship with) the matching string. The data processing system may determine the target audience for the connection to be the identified target audience with the matching string.

In some instances, the data processing system may identify multiple target audiences that match the objects or items that have been displayed on served web pages. When this occurs, the data processing system may maintain counters for the different target audiences that the data processing system may increment for each instance an object or item has a match with a string in the database. In such instances, the data processing system may determine the target audience for the connection by identifying the target audience that has the highest count of the counters. In some embodiments, the data processing system may determine a predefined number of target audiences (e.g., a number of target audiences exceeding one) for a connection. In such embodiments, the data processing system may identify the predefined number of the highest counts to determine the target audiences for the connection.

In some embodiments, at operation 922, the data processing system compares items or objects on the requested web page to the database. For example, the data processing system may perform operations 918 and 920 to analyze and extract objects or items from the web page that the client device requests from the data processing system and compare the extracted objects or items from the web page to the database. The data processing system may identify any strings in the database that match the detected objects or items from the requested web page and identify the corresponding target audience to the identified strings. The data processing system may increment the target audience counters based on the extracted objects or items that match the strings in the database in addition to the increments the data processing system performs upon identifying matching strings to items or objects that were extracted from the detected web pages.

In some embodiments, instead of analyzing the items or objects that are included in the detected web pages, at operation 920, the data processing system evaluates identifiers of the webpages themselves to determine the target audience for the connection. For example, the data processing system may store target audience identifiers for each web page that the data processing system serves to the client device. The target audience identifiers may indicate the target audience with which the individual web pages are associated. The data processing system may maintain counters for different target audiences. The data processing system may increment a counter each time the data processing system serves the client device a web page with a target identifier for the target audience of the counter. The data processing system may identify the target audience or target audiences for the connection based on a counter or counters with the highest counts. In instances in which the data processing system only detects one web page or the data processing system determines (e.g., by determining each target audience identifier of the detected web pages match), the data processing system may avoid the processing requirements of maintaining and analyzing counters and instead just identify the target audience for the connection based on the target audience identifier of the detected web page or web pages.

In some embodiments, at operation 918, the data processing system compares the target audience identifier of the requested web page to the database. For example, in addition to incrementing the counters based on target audience identifiers of detected web pages, the data processing system may extract a target audience identifier of the requested web page from memory and increment the counter corresponding to the target audience identifier of the requested web page. Thus, the data processing system may have the additional information from the requested web page in addition to the information from the detected previously accessed web pages to more accurately determine a target audience for a connection.

After determining a target audience for the connection, at operation 926, the data processing system may determine if the data processing system has previously transmitted a content item to the client device over the connection. For example, the data processing system may store lists of content items that the data processing system has transmitted to computing devices over a network. The data processing system may initialize each of the lists to have zero content items upon creation of the connection for the list. Then, as the data processing system transmits content items to the client device over the connection, the data processing system may add identifiers of the transmitted content items to the lists of the respective connections. Thus, the data processing system may maintain active lists of the content items the data processing system has transmitted to various connections.

Before selecting a content item to transmit to the client device with the requested web page, the data processing system may determine if the data processing system has previously sent the client device the content item over the connection. The data processing system may do so by identifying the list that the data processing system has stored for the connection with the client device. For example, the data processing system may store associations between any content items that the data processing system has transmitted over the connection and the session identifier for the connection. The data processing system may add content items to the list as the data processing system transmits the content items over the connection.

The data processing system may determine the number, if any, of content items the data processing system has previously transmitted to the client device over the connection by identifying the number of content items on the list of content items. To do so, the data processing system may maintain a counter for a list and increment the counter for each content item identified on the list. In some embodiments, the data processing system may maintain a counter of the number of content items the data processing system has transmitted over the connection and increment the counter for each content item transmission.

If the data processing system determines the data processing system has not served any content items to the client device, at operation 928, the data processing system selects the content item that is associated with the highest-ranking value in the content item database. In some embodiments, the data processing system may select the content item with the highest-ranking value for the target audience (e.g., highest target audience ranking value) that the data processing system determined for the connection. For example, the data processing system may receive a request over a connection for a web page including a location for a content item and determine a target audience for the connection is basketball. The data processing system may then identify a set of content items from the content item database that correspond to the basketball target audience. The data processing system may identify and select the basketball content item that is associated with the highest-ranking value in the content item database.

However, if the data processing system determines the data processing system has transmitted one or more other content items over the connection, at operation 930, the data processing system may identify and select a content item based on the number of content items that were previously transmitted over the connection. For instance, after receiving a request for a web page over a connection and determining a target audience for the connection, the data processing system may identify the number of content items the data processing system has transmitted over the connection to the client device. The data processing system may then identify a content item based on the number. For example, if the data processing system has transmitted four content items for basketball over the connection to the client device, the data processing system may identify and select the content item with a ranking value of five (e.g., the number of content items the data processing system has previously transmitted plus one) from the content item database. In doing so, the data processing system may avoid transmitting repetitive content to the client device during the same connection.

In some embodiments, the data processing system may further select content items based on the individual content items that the data processing system has previously served over the connection. Such may be the case, for example, if the data processing system had previously determined the client device was associated with one target audience and the data processing system changes the target audience determination for the connection in real-time as the client device accesses further web pages over the connection. For example, the data processing system may initially determine a connection with the client device being accessed by someone who enjoys cooking (e.g., a cooking target audience). Accordingly, over the course of the connection, the data processing system may have served a number of content items associated with the cooking target audience to the client device and maintain a list of the content items related to the cooking target audience that the data processing system has transmitted over the connection (e.g., a list with a stored association with the session identifier for the connection). However, as the c requests further web pages over the connection and the data processing system analyzes the web pages or target audience identifiers associated with the web pages, the data processing system may eventually determine the target audience for the client device is a different target audience, such as kitchenware. Because there would likely be overlap between the content items that are associated with the cooking target audience and the kitchenware target audience (e.g., content items may be associated with identifiers of both target audiences in a database), the data processing system may have an added criteria in which the data processing system analyzes the content items that the data processing system transmitted over the connection.

Continuing with the example of cooking and kitchenware target audiences above, if the data processing system receives a request over the connection for a web page that includes a location for a content item, the data processing system may identify the number of content items the data processing system has served based only on the kitchenware target audience (any content items that are associated with cooking and kitchenware target audiences but that were selected based on the association with the cooking target audience would not be included in the count). The data processing system may select the highest ranked content item associated with kitchenware if the data processing system has not previously selected any content items based on the cooking target audience identifier or select the content item based on the number of content items the data processing system has transmitted over the connection based on the kitchenware target audience (e.g., select the content audience with a kitchenware target audience ranking of the number of previously transmitted content items plus one). However, if the data processing system determines the data processing system has already transmitted the selected content item for the kitchenware target audience in response to another request (e.g., the data processing system compares the string identifying the selected content item to a list of content items the data processing system has transmitted over the connection), the data processing system may increment the number of content items the data processing system has selected for the target audience. The data processing system may accordingly select the next highest ranked content item for the target audience.

In some embodiments, the data processing system may select a content item from a subset of content items that correspond to the location on the requested web page. For example, the location on the web page may be associated with a product, such as shampoo. The data processing system may store ten content items that have stored association with the shampoo product (e.g., associations with identifiers of shampoo). Accordingly, when selecting which content items to transmit to the client device in response to the request, the data processing system may identify a subset of content items that have a stored association with shampoo and compare the target audience rankings of the subset to select the content item that has the highest ranking for the determined target audience and/or that the data processing system has not transmitted over the connection.

At operation 932, the data processing system transmits the selected content item to the client device. The data processing system may do so by identifying the location on the requested web page that is dedicated to storing content items for display and inserting the selected content item at the location. The data processing system may then transmit the requested web page including the selected content item at the location to the client device to present the web page and content item on a display of the client device.

The data processing system may repeat operations 908-932 over time and as the client device requests web pages to continuously provide relevant content to the client device over the connection. In doing so, because the data processing system may detect more web pages that the data processing system transmits to the client device as the client device requests web pages, the data processing system may have more information about the correct target audience for the connection. This may result in the data processing system determining different target audiences for the connection over the course of the connection.

Notably, the data processing system may serve content items to client devices on a connection-by-connection basis. Accordingly, if a client device ends the connection with the data processing system, the data processing system may discard or clear any counts or records that the data processing system has served the client device, in some cases including the session identifier for the connection. When the client device establishes a new connection with the data processing system and requests a web page from the data processing system, the data processing system may repeat method 900. Such repetition may result in the data processing system sending the same or similar content items that the data processing system served during a previous connection. Thus, the data processing system may still provide high performing content to individuals at set time intervals but may not inundate individuals with the same content over and over again during a connection.

In some embodiments, the data processing system may select multiple content items to present on a web page at once. For example, the data processing system may analyze a requested or retrieved web page and determine there are multiple locations for content items, either based on an indication that the web page has multiple locations based on the object recognition techniques that the data processing system performs detecting multiple locations. Upon detecting multiple locations, the data processing system may perform the systems and methods described herein to select the detected multiple of highest ranked and, in some cases, not previously shown during the connection, content items for the determined target audience. The data processing system may then transmit the selected content items to the requesting client device.

For example, a client device may request a page with a listing of products that are available from the owner of the data processing system. The data processing system may store a set of images for each of the products on the listing. After receiving the request, the data processing system may determine the target audience for the connection between the data processing system and the requesting client device, select the highest ranked content item that has not previously been shown for the target audience for each set of images, and transmit the selected content items to the client device with the web page. Accordingly, the client device may transmit the web page to the client device with the highest performing content items depicting the list of products.

Figure 10:
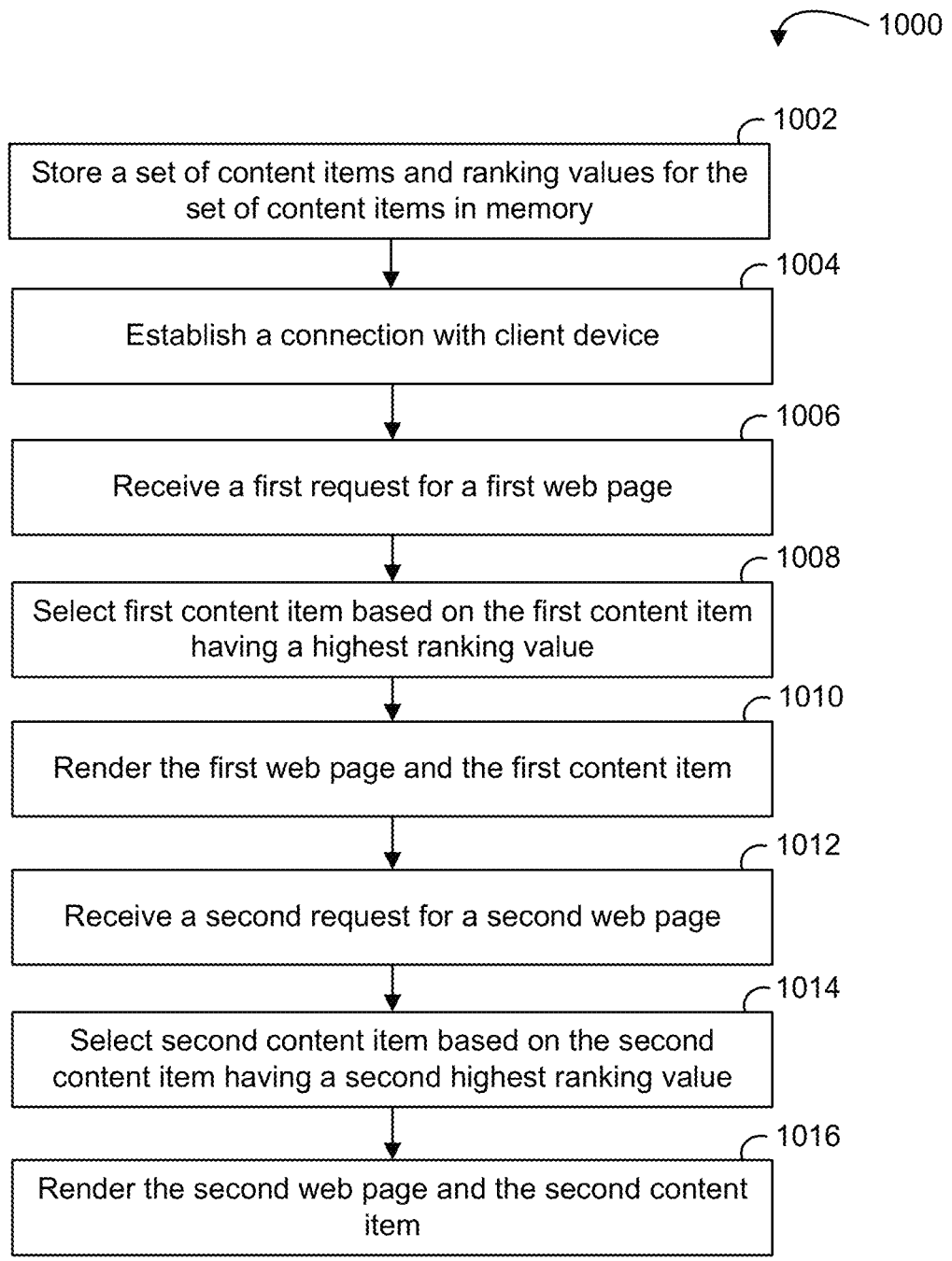
FIG. 10 illustrates another method for content selection using first-party cookie data, in accordance with one or more implementations.

FIG. 10 illustrates another method for content selection using first-party cookie data, in accordance with one or more implementations. Method 1000 can be performed by a data processing system (e.g., content manager 702, shown and described with reference to FIG. 7, a server system, etc.). Method 1000 may include more or fewer operations and the operations may be performed in any order. Performance of method 1000 may enable the data processing system to provide computing devices with content that is relevant to users accessing the computing devices without relying on third-party cookie data to do so. Instead, the data processing system may establish a connection with a computing device via the computing device's browser and provide content to the computing device based on stored rankings of the content. Thus, the data processing system can avoid the need for any third-party cookie data and instead only rely on stored content item rankings to provide content to client devices over a connection.

At operation 1002, the data processing system stores a set of content items and ranking values for the set of content items in memory. The ranking values may be ranking values for the content items in general or for specific target audiences. At operation 1004, the data processing system establishes a connection with a client device. At operation 1006, the data processing system receives a request for a first web page. The data processing system may perform operations 1002-1006 in a similar manner to how the data processing system performs operations 902-908, shown and described with reference to FIG. 9.

At operation 1008, the data processing system may select a first content item based on the first content item having a highest-ranking value. For example, after receiving the request for the first web page, the data processing system may determine if the requested first web page includes a location to place a content item (as described above). If the data processing system determines the requested web page includes such a location, the data processing system may query the content item database for a content item that has the highest ranking (e.g., the highest-ranking value) in the content item database. In some embodiments, the data processing system queries the content item database for a content item with the highest ranking and that has not been presented over the connection yet. The data processing system may identify the content item during the query responsive to the content item having the highest ranking and/or not being transmitted over the connection yet.

In some embodiments, the data processing system may select the first content item based on the first content item having a highest target audience ranking of the content items in the content item database. For instance, the content items in the content item database may each have rankings for different target audiences that indicate how the content items perform with the respective target audiences compared with each other (e.g., each content item may have a target audience ranking determined based on the content item's target audience performance score compared with the target audience performance score of other content items for the same target audience). The data processing system may identify a target audience identifier that has a stored association with the requested web page and query the content item database for the content item with the highest target audience ranking for the same target audience as the target audience identifier. In some embodiments, the data processing system may determine the target audience for the web page by extracting items or objects from the web page and comparing the extracted items or objects to strings in a database that have stored associations with one or more target audiences. Thus, the data processing system may provide relevant content to client devices based on the content that users of the client devices are currently viewing.

At operation 1010, the data processing system may render the first web page and the selected first content item at the requesting client device. The data processing system may render the first web page and the content item by transmitting the first web page and first content item to the client device. The data processing system may insert the selected first content item into the web page at the location for which the first content item was retrieved and transmit the first web page with the first content item to the client device. Upon receipt of the first web page and first content item, the client device may present the first web page and first content item on a display.

At operation 1012, the data processing system may receive a second request for a second web page. The data processing system may receive the second request similar to how the data processing system received the first request at operation 1006.

At operation 1014, the data processing system may select a second content item in response to the request. The data processing system may select the second content item in response to determining the second web page includes a location to insert a content item. The data processing system may select the second content item further in response to determining the data processing has already transmitted the first content item over the connection. For instance, after receiving the request for the second web page and determining there is a location to insert a content item in the second web page, the data processing system may identify the number of content items that have already been transmitted over the connection (e.g., maintain a counter that the data processing system increments for each content item the data processing system has transmitted over the connection). The data processing system may determine the count of the counter and retrieve the content item with a ranking equal to the count plus one. Accordingly, the data processing system may transmit differing high performing content items to a client device during a connection.

In embodiments in which the data processing system transmits content items over the connection based on the target audience identifiers of the requested web pages, the data processing system may similarly provide content items that are associated with the respective target audience with the highest ranking that the data processing system has not transmitted over the connection. For example, the data processing system may identify a target audience of the requested second web page from the database. The data processing system may identify the number of content items that the data processing system has transmitted over the connection for the target audience (e.g., by maintaining a counter that increments for each transmission). The data processing system may determine the count of the counter and retrieve the content item that has a target audience ranking for the target audience of the count plus one. In some embodiments, before selecting the second item to transmit the content item to the client device, the data processing system may determine if the content item has already been displayed during the connection. For example, upon transmitting a content item over the connection, the data processing system may store an indication in a data structure (e.g., the content item database) that stores the content item that the content item has already been rendered or transmitted over the connection. The data processing system may do so, for example, by adding a string identifying the content item to a list associated with a session identifier of the connection. This may occur when the data processing system transmits the content item over the connection with a web page that is associated with a different target audience and the content item was selected based on its ranking for that target audience. If the data processing system determines the content item has already been displayed, the data processing system may select the content item with the next highest target audience ranking that has not yet been displayed.

At operation 1016, the data processing system may render the second web page and the selected second content item at the requesting client device. The data processing system may render the second web page and the content item by transmitting the second web page and content item to the client device. The data processing system may insert the second content item into the second web page at the location for which the second content item was retrieved and transmit the second web page with the second content item to the client device. Upon receipt of the second web page and second content item, the client device may present the second web page and content item on a display of the client device.

Figure 11:
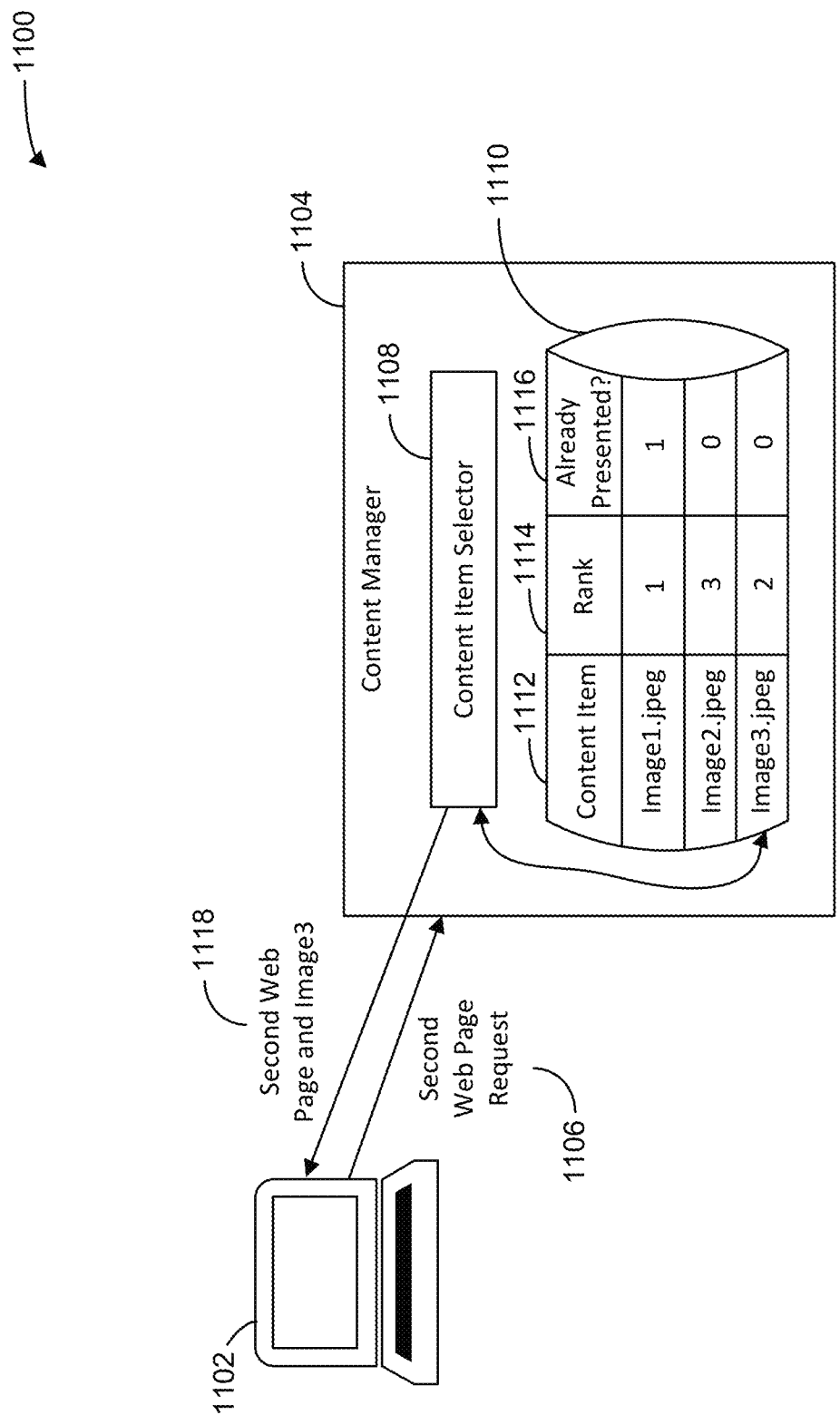
FIG. 11 illustrates an example sequence for content selection using first-party cookie data, in accordance with one or more implementations.

FIG. 11 illustrates an example sequence 1100 for content selection using first-party cookie data, in accordance with one or more implementations. Sequence 1100 may include a client device 1102 and a content manager 1104 interacting with each other such that content manager 1104 may transmit relevant high performing content to client device 1102. Client device 1102 may be similar to client device 708 and content manager 1104 may be similar to content manager 702, each shown and described with reference to FIG. 7. In sequence 1100, client device 1102 may transmit a request for a second web page 1106 to content manager 1104. Client device 1102 may transmit the request over a connection that client device 1102 has previously established with content manager 1104.

Content manager 1104 may include a content item selector 1108 and a content item database 1110. Content item selector 1108 may comprise executable instructions that, when executed by a processor of content manager 1104, may cause the processor to select a content item from content item database 1110 to transmit to client device 1102. Content item database 1110 may be a relational database that stores content items and data for the content items such as target audience rankings for the content items and indications of whether the content items have been transmitted over various connections (e.g., lists of content items that have been transmitted over different connections). As shown, content item database 1110 may include a list of content items 1112 that includes pointers to content items stored in content item database 1110, rankings 1114 (e.g., target audience rankings)

for the content items of list 1112, and/or indications 1116 of whether the content items have been transmitted over individual connections.

Content item selector 1108 may receive the request for a second web page, identify the second web page in the request, and determine whether the second web page has a location or slot to place a content item. Upon determining the second web page has a location to place a content item, content item selector 1108 may evaluate the first-party cookie data of the connection with client device 1102 to determine a target audience of the connection. Content item selector 1108 may then select a content item from content item database 1110 based on the content item having a highest target audience ranking for the target audience and/or based on the content item not previously being transmitted over the connection. Content item selector 1108 may then transmit the selected content item and the requested web page to client device 1102 in a message 1118.

Figure 12:
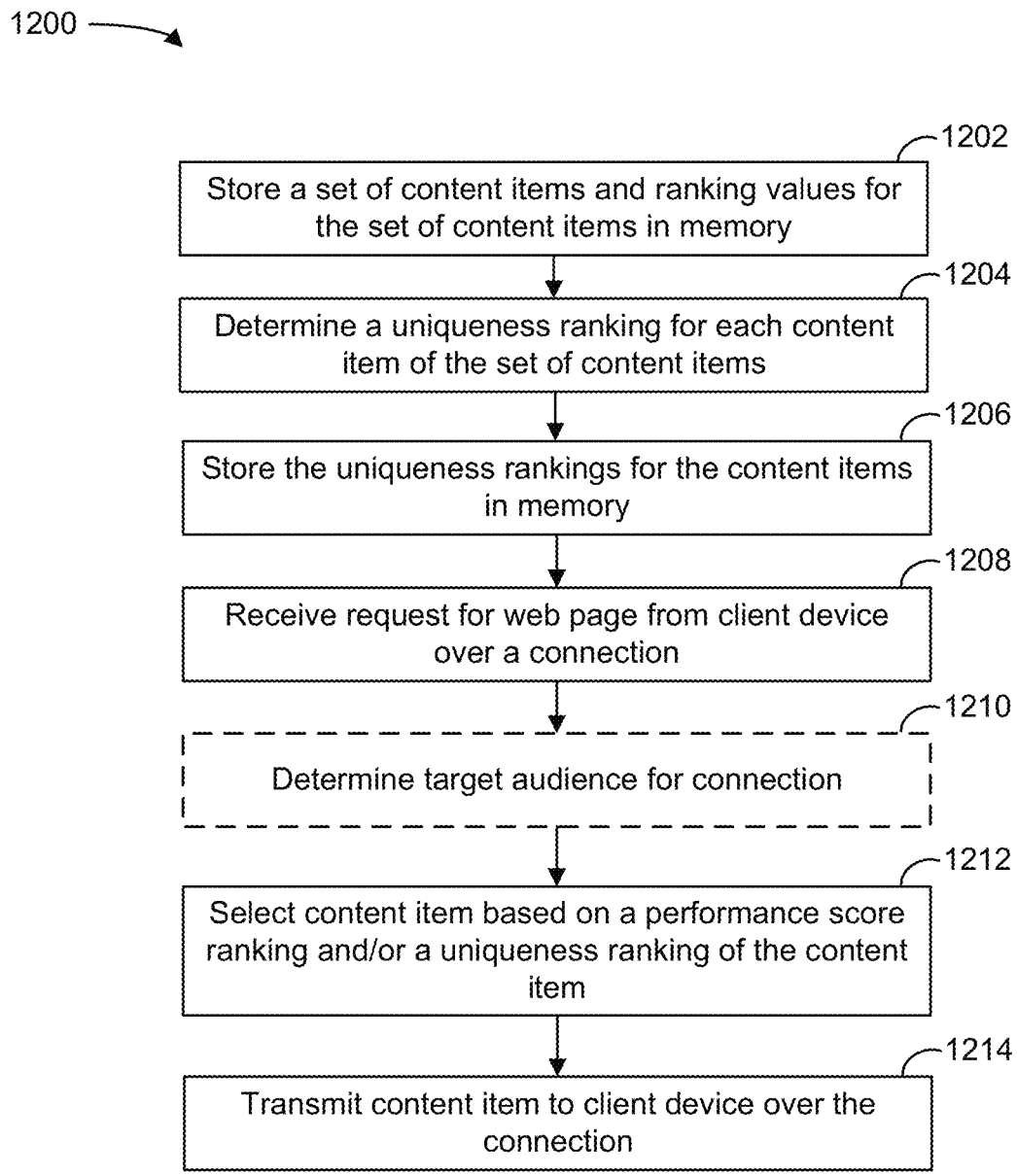
FIG. 12 illustrates another method for content selection using first-party cookie data, in accordance with one or more implementations.

FIG. 12 illustrates another method for content selection, in accordance with one or more implementations. Method 1200 can be performed by a data processing system (e.g., content manager 702, shown and described with reference to FIG. 7, a server system, etc.). Method 1200 may include more or fewer operations and the operations may be performed in any order. Performance of method 1200 may enable the data processing system to provide computing devices with content that is unique and relevant to users accessing the computing devices without relying on third-party cookie data to do so. Instead, the data processing system may establish a connection with a computing device via the computing device's browser and provide content to the computing device based on stored rankings of the content. Thus, the data processing system can avoid the need for any third-party cookie data and instead only rely on stored content item rankings to provide content to client devices over a connection.

At operation 1202, the data processing system stores a set of content items and ranking values for the set of content items in memory. The data processing system may perform operation 1202 in a similar manner to how the data processing system performs operations 902, shown and described with reference to FIG. 9.

At operation 1204, the data processing system determines one or more uniqueness rankings for each content item of the set of content items. A uniqueness ranking of a content item may indicate how unique the content item is compared to other content items. In some embodiments, the data processing system may determine the uniqueness value for a content item by extracting individual features from the content item and from other content items that the data processing system has stored. The data processing system may maintain counters for the different extracted features types and increment the counters for each content item that has the respective feature. To determine the uniqueness of the content item, the data processing system may identify the counters for the features that the data processing system extracted from the content item and aggregate the counts of the counters together. The data processing system may compare the aggregated count to similarly aggregated counts of other content items and determine a uniqueness value or ranking (e.g., ranking value) for the content item based on the comparison (e.g., smaller aggregated counts compared to other aggregated counts may have a higher uniqueness ranking than larger aggregated counts). The data processing system may similarly determine uniqueness values or rankings for each stored content item and store the uniqueness rankings and, in some cases, the aggregated counts with the corresponding content items such that the data processing system may retrieve or identify the uniqueness rankings and counts that are associated with the respective content items.

In some embodiments, the uniqueness of a content item can be calculated using probabilistic models. The data processing system may store a machine learning model in memory that can model the feature distribution of training content item samples. One example is using one or more generative Gaussian mixture models (GMM). GMM is a probabilistic model that assumes that data is generated from a limited number of Gaussian distributions. In this application, each of the Gaussian distributions may represent one type of content. For example, one type of content may be sneakers with simple backgrounds, while other types of content may represent lifestyle images where a person is running in those sneakers. To determine a uniqueness score for a new content item, the data processing system may compare the content item to the distributions in the GMM. Based on the comparison, the data processing system may determine a log-likelihood of the content item. The data processing system may determine the uniqueness score for the content item as being inversely proportional to the log-likelihood of the content item. The data processing system may compare the score or the log-likelihood to the threshold. If the score or log-likelihood exceeds the threshold, the data processing system may determine the content item is unique. Other examples of machine learning models that may be used to determine a uniqueness of a content item include outlier detection models and clustering algorithms (e.g., k-nearest neighbor, k-means clustering, etc.). The data processing may insert a content item into the machine learning model configured to determine a uniqueness for content items to obtain a uniqueness score for the content item. The uniqueness score may represent a probability or a score of how unique the content item is compared to the content items the machine learning model used for training. The data processing system may compare the uniqueness scores of the content items in the database to determine uniqueness rankings of the content items compared with each other.

In some embodiments, the data processing system may determine a uniqueness ranking for content items compared to other content items for a specific target audience. For example, for a content item, the data processing system may identify a target audience identifier that is associated with the content item in a content item database that stores the content items. The data processing system may then identify a subset of content items from memory that are associated with the same target audience identifier as the content item. The data processing system may then use the same methods described above with the content items that are associated with the target audience identifier to determine target audience uniqueness rankings and/or aggregated counts for the subset of content items. The data processing system may determine target audience uniqueness rankings and/or aggregated counts for any number of target audiences, in some cases for multiple target audiences of the same content item (e.g., a content item may have a uniqueness ranking associated with a basketball target audience and a uniqueness ranking associated with a sports target audience). The data processing system may store the target audience uniqueness rankings and/or aggregated counts with the respective content items instead of or in addition to the general uniqueness ranking and/or aggregated count as described above.

In embodiments in which the data processing system determines the uniqueness of various content items for content items for a certain target audience, the data processing system may use machine learning models that are trained to do so. For example, each of the machine learning models may be trained to output uniqueness scores only using images that have been tagged with the same target audience identifier. For instance, one machine learning model may be trained only with content items associated with a basketball target audience identifier while another machine learning model may trained only with content items associated with a soccer target audience identifier. In this way, the machine learning models may be trained to determine the uniqueness scores and ranking of new content items compared with content items for specific target audiences. Further, the data processing system may determine target audience uniqueness rankings for content items using machine learning models that are uniquely trained to do so.

In some embodiments, the data processing system may update the uniqueness rankings for the content items in content item database in real-time. For example, upon receiving a new content item, the data processing system may extract features from the new content item and compare the extracted features to the features from the other content items stored in the content item database. The data processing system may update the counts of the feature counters for the content items, including the new content item, based on the features of the content items and the new content item that match. The data processing system may then recalculate the aggregate counts for the content items and assign new rankings to the content items based on the recalculated aggregated counts. The data processing system may do so for both the general uniqueness ranking and the target audience uniqueness ranking of the content items that are associated with the same target audience or target audiences as the new content item.

Advantageously, by taking uniqueness, specific attributes, and/or specific features of images into account when selecting content items to transmit across the connection, the data processing system may select content items that are more attention-grabbing to the recipients. For example, if a content item has unique and distinct characteristics, the content item may be more visible, noticeable, and/or memorable to the human eye. Thus, using uniqueness alone or in combination with a performance score to select the content item can better enable the data processing system to provide relevant and interesting content to a user, particularly when the uniqueness is determined in the context of the target audience for a connection.

At operation 1208, the data processing system receives a request for a web page from a client device over a connection. In some embodiments, the data processing system receives the request after establishing the connection with the client device and sending one or more web pages to the client device. In some embodiments, subsequent or responsive to receiving the request for a web page, the data processing system may determine a target audience for the connection. The data processing system may perform operations 1208-1210 in a similar manner to how the data processing system performs operations 906-916, shown and described with reference to FIG. 9.

At operation 1212, the data processing system selects a content item for the requested web page. The data processing system may select the content item based on a performance score ranking (e.g., the ranking described with reference to FIG. 9), and/or a uniqueness ranking of the content item. In embodiments in which the data processing system selects the content item based on a uniqueness ranking of the content item, the data processing system may select the content item based on the content item having a highest uniqueness ranking. For example, after receiving the request for the web page, the data processing system may query the content item database storing the set of content items and uniqueness rankings for the content items for a content item that has the highest uniqueness ranking. In some embodiments, the data processing system queries the content item database for a content item with the highest uniqueness ranking and that has not been presented over the connection yet. The data processing system may identify the content item during the query responsive to the content item having the highest uniqueness ranking and/or not being transmitted over the connection yet. If the data processing system first selects a content item that the data processing system has previously transmitted to the requesting client device across the connection, the data processing system may select the content item with the next highest uniqueness ranking.

In embodiments in which the data processing system selects the content item based on a uniqueness ranking and a performance score ranking of the content item, the data processing system may implement one or more rules to do so. For example, the data processing system may implement a weighting rule in which the uniqueness rankings and performance score rankings are weighted by weights defined in memory of the data processing system and aggregated or otherwise combined. The data processing system may then select the content item based on the content item having the lowest (or highest) aggregated ranking of the content items stored in the database. In another example, the data processing system may use the uniqueness ranking or the performance score ranking as a filtering criteria and identify a predefined number of content items of the set of content items that have the highest performance score ranking or uniqueness rankings. The data processing system may then select the content item from the filtered content items that has the highest other ranking (e.g., if the data processing system identified the five content items with the highest performance rankings, the data processing system may select the content item of the five with the highest uniqueness ranking, and vice versa). If the data processing system first selects a content item that the data processing system has previously transmitted to the requesting client device across the connection, the data processing system may select the next content item that satisfies the rule (e.g., select the content item with the next highest aggregate ranking or ranking of a filtered subset). The data processing system may use any rule to select the content item using the uniqueness rankings and performance score rankings.

In embodiments, in which the data processing system selects the content item based on the performance score ranking of the content item, the data processing system may do so using similar techniques to the techniques described with reference to operations 926-930, shown and described with reference to FIG. 9.

In some embodiments, when selecting the content item, the data processing system may first filter the content items such that the data processing system only selects the content item from a subset of content items that are associated with the target audience identified for the connection with the requesting client device in operation 1210. For instance, in another example, the data processing system may determine the target audience for the connection and identify the content items that are associated with an identifier for the target audience. The data processing system may then select the content item from the identified content items using the above-described methods, in some cases based on the target audience uniqueness rankings of the identified content items.

In some embodiments, the data processing system may select the content item based on the uniqueness of the content item compared to the content items that have already been transmitted to the client device over the connection. For example, if the data processing system has already transmitted four content items to the client device over the connection, the data processing system may select the content item (e.g., the fifth content item) based on how unique the fifth content item is compared to the past four content items. For instance, a content item may be an image or video of a pair of sneakers. The past four content items may have been the same pair of sneakers in different colors with the same background. The data processing system may select the fifth image as an image of a person wearing the sneaker or an image of a sneaker with a background of a basketball field because the image is unique compared to the past four images.

To select the content item based on the content item's uniqueness compared to previously transmitted content items, the data processing may generate a machine learning model (e.g., a GMM) for the connection after the connection is established. For instance, after the data processing system establishes a connection with a client device and transmits a content item over the connection, the data processing system may add the features of the content item to a GMM. As the data processing system transmits further content items over the connection, the data processing system may continue to add the features of the content items to the GMM. When selecting the next content item to transmit over the connection, the data processing system may do so based on the content item having a highest uniqueness of the content items that the data processing system has not yet transmitted over the connection (in some cases of the content items that are associated with the target audience that is associated with the connection). The data processing system may determine the content item has the highest uniqueness by comparing content items (e.g., content items that are associated with the target audience that is associated with the connection) with the GMM and calculating the log-likelihoods of the content items from the GMM. The data processing system may determine the content item that has the lowest log likelihood as having the highest uniqueness and select the content item accordingly.

In some embodiments, the data processing system may only select the content item based on its uniqueness compared to previously transmitted content items once the data processing system has transmitted a number of content items over the connection to reach or exceed a threshold. For example, the data processing system may store a defined threshold of seven content items. The data processing system may transmit seven content items to the client device using the systems and methods described herein (e.g., based on overall performance score rankings and/or uniqueness rankings of the transmitted content items). After transmitting each of the seven content items over the connection, the data processing system may add the content items to a GMM trained only on data from the connection. The data processing system may receive a request to transmit a content item (or a request for a web page with a location for a content item) and determine this content item will be the eighth content item the data processing system will transmit over the connection and eight exceeds the seven content item threshold. Accordingly, the data processing system may select the eighth content item by determining a uniqueness of the eighth content item compared to the previous seven content items using the GMM, determining the uniqueness of the other content items of the target audience for the connection, determining the eighth content item has the highest uniqueness value of the content items for the target audience, and selecting the eighth content item accordingly. By waiting until enough content items have been transmitted over the connection to use a connection-specific GMM to select a content item, the data processing system may ensure the connection-specific GMM is sufficiently trained to provide an accurate uniqueness score for an image.

At operation 1214, the data processing system transmits the selected content item to the requesting client device over the connection. The data processing system may perform operation 1214 in a similar manner to how the data processing system performs operation 932, shown and described with reference to FIG. 9.

Although the operations of method 1200 are described as a separate method, the steps may be integrated into methods 900 and 1000, shown and described with reference to FIGS. 9 and 10, respectively. For instance, the data processing system may select the content item in steps 928, 930, 1008, and/or 1014 based on the uniqueness ranking instead of or in addition to the performance score ranking of the content item. By doing so, the data processing system may better provide relevant content to users without having access to third party cookie data and account for the restrictions that web browser providers are setting on their browsers.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method, comprising:
   establishing, by a computing device, a first connection with a client device via an application executing on the client device;
   detecting, by the computing device, one or more web pages that the computing device transmits to the application of the client device over the established first connection, the one or more web pages corresponding to a first plurality of target audiences;
   incrementing, by the computing device, a first counter corresponding to a first target audience for each of the one or more web pages that the computing device transmits to the client device over the established first connection and that has a stored association in memory with the first target audience;
   determining, by the computing device, the first target audience corresponds to the first connection based on a count of the first counter satisfying a condition;
   responsive to determining the first target audience corresponds to the first connection, identifying, by the computing device, a set of content items from memory of the computing device based on each content item of the set having a stored association with an identifier of the first target audience in the memory;
   selecting, by the computing device, a first content item from the set of content items responsive to the first content item having a first stored ranking value higher than a second stored ranking value of a second content item of the set of content items;

transmitting, by the computing device, the first content item to the client device over the first connection for display on a first web page,
responsive to detecting an end to the first connection with the client device, discarding, by the computing device, the first counter;
subsequent to discarding the first counter, establishing, by the computing device, a second connection with the client device via the application executing on the client device;
incrementing, by the computing device, a count of a second counter corresponding to the first target audience for each web page that the computing device transmits to the client device over the established second connection and that has a stored association in memory with the first target audience; and
transmitting, by the computing device, a second content item corresponding to the first target audience to the client device over the second connection for display on a second web page responsive to determining the count of the second counter corresponding to the first target audience satisfies the condition.

2. The method of claim 1, further comprising:
receiving, by the computing device, a request for the first web page from the application executing on the client device,
wherein transmitting the first content item to the client device is performed in response to receiving the request.

3. The method of claim 1, further comprising:
storing, by the computing device, each content item of the set of content items in the memory of the computing device with a stored ranking value, the stored ranking value ranking the respective content item in comparison to other content items of the set of content items,
wherein selecting the first content item from the set of content items comprises selecting the first content item responsive to the first content item having a highest ranking value of the set of content items.

4. The method of claim 3, further comprising:
receiving, by the computing device, a request for a new web page from the application executing on the client device;
determining, by the computing device, the computing device has transmitted the first content item to the client device during the first connection;
in response to determining the computing device has transmitted the first content item to the client device during the first connection, selecting, by the computing device, a third content item from the set of content items based on the third content item having a second highest stored ranking value of the set of content items; and
transmitting, by the computing device, the third content item from the set of content items and a second web page to the client device via the first connection in response to the request.

5. The method of claim 1, wherein detecting the one or more web pages that the computing device transmits to the application of the client device during the established first connection comprises:
receiving, by the computing device, a request for a second web page from the application executing on the client device; and
responsive to receiving the request, identifying, by the computing device, the second web page and subject matter for the second web page,
wherein determining the first target audience corresponds to the first connection comprises determining, by the computing device, the first target audience based on the identified subject matter.

6. The method of claim 5, wherein identifying the subject matter for the second web page comprises identifying an item on the second web page.

7. The method of claim 6, wherein determining the first target audience corresponds to the first connection comprises determining, by the computing device, the first target audience based on the item having a stored association with an identifier of the first target audience in the memory of the computing device.

8. The method of claim 1, further comprising:
receiving, by the computing device, a request for a new web page from the application executing on the client device; and
responsive to receiving the request, identifying, by the computing device, a second web page,
wherein determining the first target audience corresponds to the first connection comprises determining, by the computing device, the first target audience corresponds to the first connection based on the second web page having a stored association with an identifier of the first target audience in the memory.

9. The method of claim 1, further comprising:
transmitting, by the computing device, the first content item to a remote computing device, receipt of the first content item causing the remote computing device to:
execute a machine learning model associated with the first target audience using the first content item as input to obtain a performance score for the first content item, and
transmit the performance score for the first content item to the computing device;
comparing, by the computing device, the performance score to performance scores for the set of content items; and
assigning, by the computing device, the first stored ranking value to the first content item based on comparison.

10. The method of claim 1, further comprising:
maintaining a counter for each of the plurality of target audiences,
wherein determining the count of the first counter that corresponds to the first target audience satisfies the condition comprises determining the count of the first counter is the highest count of the counters for the plurality of target audiences.

11. The method of claim 1, comprising:
generating, by the computing device, a session identifier for the first connection responsive to establishing the first connection;
receiving, by the computing device from the client device over the first connection, a request for a first web page corresponding to the first target audience, the request containing the session identifier;
incrementing, by the computing device, the count of the first counter based on the requested first web page and the request containing the session identifier;
determining, by the computing device, the first target audience corresponds to the first connection based on the count of the first counter incremented based on the requested web page satisfying the condition; and
transmitting, by the computing device, the first content item to the client device over the first connection for display on the requested first web page.

12. The method of claim 11, comprising:
generating, by the computing device, a second session identifier for the second connection responsive to establishing the second connection;
transmitting, by the computing device, a second content item corresponding to the first target audience to the client device over the second connection for display on the second web page responsive to receiving a request for a second web page containing the second session identifier.

13. A system, the system comprising:
one or more hardware computing devices configured by machine-readable instructions to:
establish a first connection with a client device via an application executing on the client device;
detect one or more web pages that the computing device transmits to the application of the client device over the established first connection, the one or more web pages corresponding to a plurality of target audiences;
incrementing, by the computing device, a first counter corresponding to a first target audience for each of the one or more web pages that the one or more hardware computing devices transmit to the client device over the established first connection and that has a stored association in memory with the first target audience;
determine the first target audience corresponds to the first connection based on a count of the first counter satisfying a condition;
responsive to determining the first target audience corresponds to the first target audience, identify a set of content items from memory of the computing device based on each content item of the set having a stored association with an identifier of the first target audience in the memory;
select a first content item from the set of content items responsive to the first content item having a first stored ranking value higher than a second stored ranking value of a second content item of the set of content items; and
transmit the first content item to the client device over the first connection for display on a first web page;
responsive to detecting an end to the first connection with the client device, discard the first counter;
subsequent to discarding the first counter, establish a second connection with the client device via the application executing on the client device;
increment a count of a second counter corresponding to the first target audience for each web page that the computing device transmits to the client device over the established second connection and that has a stored association in memory with the first target audience; and
transmit a second content item corresponding to the first target audience to the client device over the second connection for display on a second web page responsive to determining the count of the second counter corresponding to the first target audience satisfies the condition.

14. The system of claim 13, wherein the one or more hardware computing devices are further configured by machine-readable instructions to:
store each content item of the set of content items in the memory of the computing device with a stored ranking value, the stored ranking value ranking the respective content item in comparison to other content items of the set of content items, wherein selecting the first content item from the set of content items comprises selecting the first content item responsive to the first content item having a highest stored ranking value of the set of content items.

15. The system of claim 14, wherein the one or more hardware computing devices are further configured by machine-readable instructions to:
receive a request for a new web page from the application executing on the client device;
determine the one or more hardware computing devices have transmitted the first content item to the client device during the first connection;
in response to determining the one or more hardware computing devices have transmitted the first content item to the client device during the first connection, select a third content item from the set of content items based on the third content item having a second highest stored ranking value of the set of content items; and
transmit the third content item from the set of content items and a second web page to the client device via the first connection in response to the request.

16. A method, comprising:
storing, by a computing device, a plurality of content items and a ranking value for each of the plurality of content items in a memory of the computing device;
establishing, by the computing device, a first connection with a client device via an application executing on the client device;
detecting, by the computing device, one or more web pages that the computing device transmits to the application of the client device over the established first connection, the one or more web pages corresponding to a plurality of target audiences;
incrementing, by the computing device, a first counter corresponding to a first target audience for each of the one or more web pages that the computing device transmits to the client device over the established first connection and that has a stored association in memory with the first target audience;
determining, by the computing device the first target audience corresponds to the first connection based on a count of the first counter satisfying a condition;
responsive to determining the first target audience corresponds to the first connection, rendering, by the computing device, a first web page and a first content item of the plurality of content items on the client device via the first connection, the first content item selected from the plurality of content items based on the first content item having a highest ranking value for the first target audience of the plurality of content items;
receiving, by the computing device, a request for a second web page from the application via the first connection;
rendering, by the computing device, the second web page and a second content item of the plurality of content items on the client device via the first connection, the second content item selected from the plurality of content items responsive to determining the first content item has already been rendered during the first connection and the second content has a second highest ranking value for the first target audience of the plurality of content items after the first content item;
responsive to detecting an end to the first connection with the client device, discarding, by the computing device, the first counter;

subsequent to discarding the first counter, establishing, by the computing device, a second connection with the client device via the application executing on the client device;

incrementing, by the computing device, a count of a second counter corresponding to the first target audience for each web page that the computing device transmits to the client device over the established second connection and that has a stored association in memory with the first target audience; and transmitting, by the computing device, a third content item corresponding to the first target audience to the client device over the second connection for display on a third web page responsive to determining the count of the second counter corresponding to the first target audience satisfies the condition.

17. The method of claim 16, further comprising:

transmitting, by the computing device, the first content item to a remote computing device, receipt of the first content item causing the remote computing device to:
 execute a machine learning model using the first content item as input to obtain a performance score for the first content item, and
 transmit the performance score for the first content item to the computing device;

comparing, by the computing device, the performance score to performance scores for the plurality of content items; and assigning, by the computing device, a ranking value to the first content item based on the comparison.

18. The method of claim 17, further comprising:

transmitting, by the computing device, a third first content item to the remote computing device, receipt of the third content item causing the remote computing device to:
 execute the machine learning model using the third content item as input to obtain a second performance score for the third content item, and
 transmit the second performance score to the computing device;
 comparing, by the computing device, the second performance score to the performance scores for the plurality of content items; and
 updating, by the computing device, ranking values of the plurality of content items based on the comparing the second performance score to the performance scores for the plurality of content items.

19. The method of claim 16, further comprising:

receiving, by the computing device, a second request for a fourth web page from the application via the first connection;

identifying, by the computing device, a second target audience responsive to the third web page having a stored association with the second target audience in the memory;

identifying, by the computing device, target audience ranking values for content items that have stored associations with the second target audience in the memory; and rendering, by the computing device, the fourth web page and a fourth content item of the plurality of content items on the client device via the first connection, the fourth content item selected from the plurality of content items responsive to determining the fourth content item has a highest target audience ranking for the second target audience of the plurality of content items.

\* \* \* \* \*